US011840301B2

(12) United States Patent
Takahashi et al.

(10) Patent No.: US 11,840,301 B2
(45) Date of Patent: Dec. 12, 2023

(54) SADDLE-RIDE TYPE VEHICLE

(71) Applicant: HONDA MOTOR CO., LTD., Tokyo (JP)

(72) Inventors: Kei Takahashi, Tokyo (JP); Takashi Sato, Tokyo (JP); Yutaka Aikyo, Tokyo (JP); Ryota Ishigaki, Yokohama (JP); Masaru Habu, Yokohama (JP); Makoto Fuma, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/914,865

(22) PCT Filed: Mar. 31, 2020

(86) PCT No.: PCT/JP2020/014965
§ 371 (c)(1),
(2) Date: Sep. 27, 2022

(87) PCT Pub. No.: WO2021/199361
PCT Pub. Date: Oct. 7, 2021

(65) Prior Publication Data
US 2023/0058627 A1 Feb. 23, 2023

(51) Int. Cl.
*B62J 27/20* (2020.01)
(52) U.S. Cl.
CPC ..................... *B62J 27/20* (2020.02)
(58) Field of Classification Search
CPC ............................. B62J 27/20; B60R 21/237
See application file for complete search history.

(56) References Cited

U.S. PATENT DOCUMENTS

| 5,022,675 | A | * | 6/1991 | Zelenak, Jr. | .......... B60R 21/201 280/743.1 |
| 2003/0189323 | A1 | * | 10/2003 | Akiyama | ................. B62J 27/20 280/729 |

(Continued)

FOREIGN PATENT DOCUMENTS

| CN | 1689875 A | * | 11/2005 | ........... B60R 21/232 |
| DE | 10248532 A1 | * | 4/2004 | ........... B60R 21/237 |

(Continued)

OTHER PUBLICATIONS

English translation of the International Preliminary Report on Patentability dated Oct. 6, 2022 issued in corresponding International application No. PCT/JP2020/014965; 4 pages.

(Continued)

*Primary Examiner* — James A English
(74) *Attorney, Agent, or Firm* — Rankin, Hill & Clark LLP

(57) ABSTRACT

A saddle-ride type vehicle includes a retainer that is disposed behind a head pipe; an inflator; and an airbag that is housed in the retainer, inflates by gas discharged by the inflator, and is deployed in front of an occupant. The airbag is housed in the retainer and includes a proximal end-side folded portion folded in a roll shape or a bellows shape, an intermediate-side folded portion extending from the proximal end-side folded portion and folded above the proximal end-side folded portion, and a distal end-side folded portion extending from the intermediate-side folded portion and folded in a roll or bellows shape in a cross section in a vehicle side view. The intermediate-side folded portion has a plurality of folding-back points at which folding is made along the distal end-side folded portion in a front-rear direction of the distal end-side folded.

6 Claims, 22 Drawing Sheets

(56) References Cited

U.S. PATENT DOCUMENTS

| | | | |
|---|---|---|---|
| 2007/0052213 A1 | 3/2007 | Miyata | |
| 2010/0007121 A1* | 1/2010 | Mendez | B60R 21/232 |
| | | | 280/730.2 |
| 2012/0126515 A1* | 5/2012 | Miyata | B60R 21/239 |
| | | | 280/730.1 |
| 2013/0001937 A1* | 1/2013 | Yamada | B60R 21/201 |
| | | | 280/732 |
| 2019/0217802 A1 | 7/2019 | Kuroe et al. | |

FOREIGN PATENT DOCUMENTS

| | | | |
|---|---|---|---|
| JP | 08276811 A * | 10/1996 | B60R 21/2171 |
| JP | 2003-291875 A | 10/2003 | |
| JP | 2007-69779 A | 3/2007 | |
| JP | 2012-111259 A | 6/2012 | |
| JP | 2017-213930 A | 12/2017 | |
| JP | 6357677 B2 | 7/2018 | |
| JP | 2019-123338 A | 7/2019 | |
| WO | WO-2018221178 A1 * | 12/2018 | B60R 21/20 |
| WO | 2019/064737 A1 | 4/2019 | |

OTHER PUBLICATIONS

International Search Report dated Jun. 23, 2020, Application No. PCT/JP2020/014965; English translation included, 4 pages.
International Preliminary Report on Patentability dated Oct. 9, 2020, Application No. PCT/JP2020/014965, 9 pages.
Japanese Office Action dated Jun. 27, 2023 issued in corresponding Japanese application No. 2022-511424; English machine translation included (7 pages).

* cited by examiner

SADDLE-RIDE TYPE VEHICLE

TECHNICAL FIELD

The present invention relates to a saddle-ride type vehicle.

BACKGROUND ART

Conventionally, a saddle-ride type vehicle including an airbag module has been known (see, for example, Patent Literature 1). In Patent Literature 1, the airbag module is supported by a main frame extending rearward and downward from a head pipe via a stay, and is disposed behind the head pipe.

CITATION LIST

Patent Literature

Patent Literature 1: JP 6357677 B2

SUMMARY OF INVENTION

Technical Problem

In a case where the airbag module is disposed more adjacent to the head pipe and disposed compactly in a front-rear direction, there is a possibility that the airbag module interferes with a handlebar in a case where the deployment of the airbag is insufficient.

The present invention has been made in view of the above circumstances, and an object of the present invention is to provide a saddle-ride type vehicle capable of efficiently deploying an airbag.

Solution to Problem

A saddle-ride type vehicle includes: a retainer (41) that is provided behind a head pipe (15); an inflator (43); and an airbag (42) that is housed in the retainer (41), inflates by gas (G) discharged by the inflator (43), and is deployed in front of an occupant, in which the airbag (42) is housed in the retainer (41) in a state of including a proximal end-side folded portion (155) folded in a roll shape or a bellows shape, an intermediate-side folded portion (154 and 354) extending from the proximal end-side folded portion (155) and folded above the proximal end-side folded portion (155), and a distal end-side folded portion (153) extending from the intermediate-side folded portion (154 and 354) and folded in a roll shape or a bellows shape in a cross section in a vehicle side view, and the intermediate-side folded portion (154 and 354) has a plurality of folding-back points (P1, P2, and P3) at which folding is made along the distal end-side folded portion (153) in a front-rear direction of the distal end-side folded portion (153) in the cross section in the vehicle side view.

In the above configuration, the folding-back points (P1, P2, and P3) may be provided on a front side and a rear side of the distal end-side folded portion (153).

In the above configuration, the retainer (41) may extend along the head pipe (15) and be open upward, and the airbag (42) may have the folding-back point (P1, P2, and P3) provided adjacent to a side surface (65 and 85) of the retainer (41).

In the above configuration, the airbag (42) may be folded bilaterally symmetrically with respect to a left-right center line (C1 and C2) of the airbag (42) in a cross section in a vehicle top view.

In the above configuration, the bilaterally symmetrically folded airbag (42) has a bellows shape.

In the above configuration, the retainer (41) may include an L-shaped airbag passage (47) from which the airbag (42) is deployed upward from a left-right direction, and the airbag (42) may be housed in the airbag passage (47).

Advantageous Effects of Invention

A saddle-ride type vehicle includes: a retainer that is provided behind a head pipe; an inflator; and an airbag that is housed in the retainer, inflates by gas discharged by the inflator, and is deployed in front of an occupant, in which the airbag is housed in the retainer in a state of including a proximal end-side folded portion folded in a roll shape or a bellows shape, an intermediate-side folded portion extending from the proximal end-side folded portion and folded above the proximal end-side folded portion, and a distal end-side folded portion extending from the intermediate-side folded portion and folded in a roll shape or a bellows shape in a cross section in a vehicle side view, and the intermediate-side folded portion has a plurality of folding-back points at which folding is made along the distal end-side folded portion in a front-rear direction of the distal end-side folded portion in the cross section in the vehicle side view. With this configuration, the airbag can be more efficiently deployed.

In the above configuration, the folding-back points may be provided on a front side and a rear side of the distal end-side folded portion. With this configuration, it is possible to adjust a direction in which the distal end-side folded portion is deployed.

In the above configuration, the retainer may extend along the head pipe and be open upward, and the airbag may have the folding-back point provided adjacent to a side surface of the retainer. With this configuration, the airbag can be more efficiently deployed.

In the above configuration, the airbag may be folded bilaterally symmetrically with respect to a left-right center line of the airbag in a cross section in a vehicle top view. With this configuration, the airbag can be deployed in a well-balanced manner in the left-right direction.

In the above configuration, the bilaterally symmetrically folded airbag has a bellows shape. With this configuration, the airbag can be easily folded and housed in the retainer.

In the above configuration, the retainer may include an L-shaped airbag passage from which the airbag is deployed upward from a left-right direction, and the airbag may be housed in the airbag passage. With this configuration, it is possible to efficiently deploy the airbag disposed in the L-shaped airbag passage.

DESCRIPTION OF EMBODIMENTS

Figure 1:
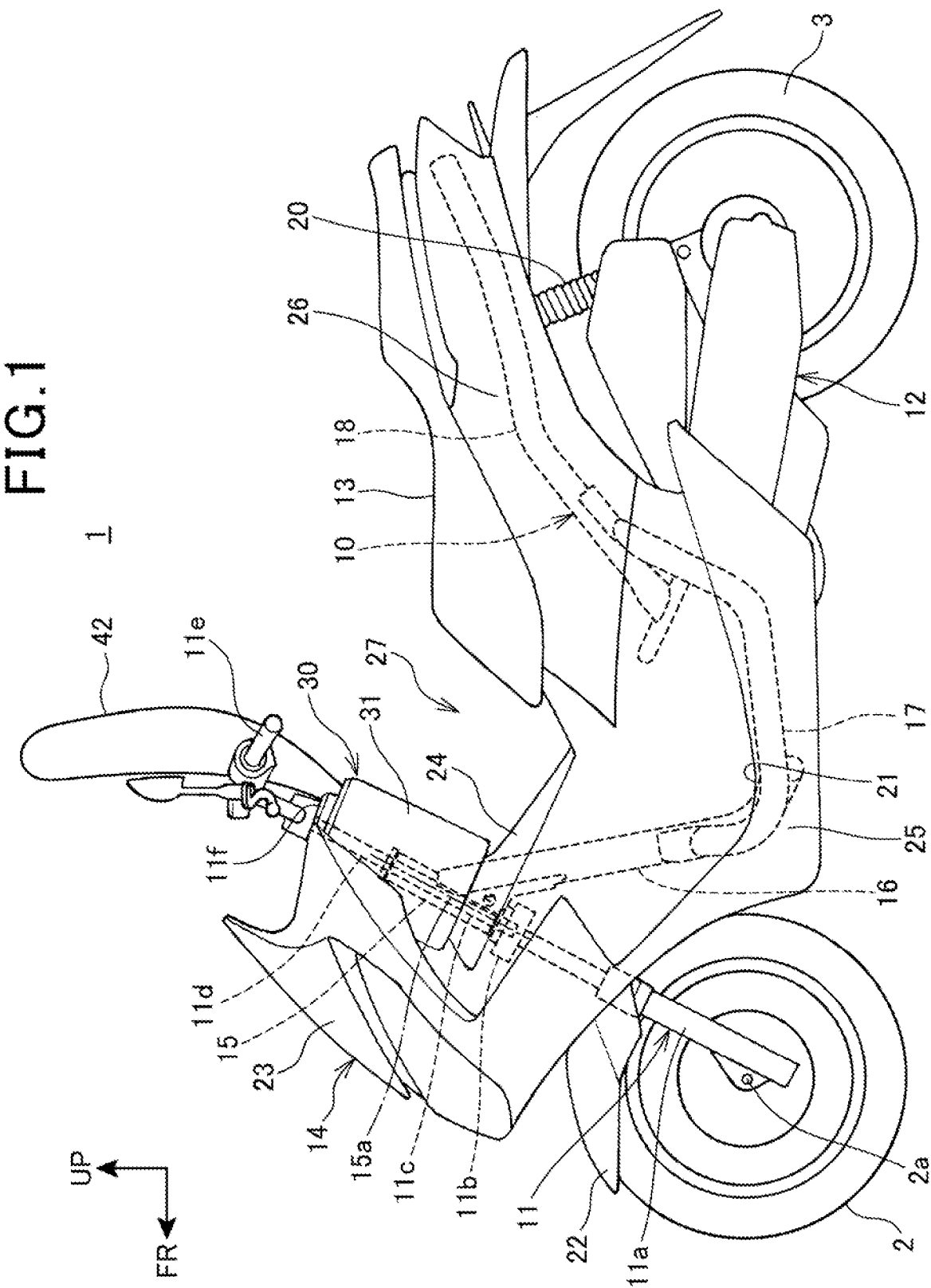
FIG. 1 is a left side view of a motorcycle according to a first embodiment of the present invention.

An embodiment of the present invention will be described below with reference to the drawings. Note that, in the description, directions such as a front-rear direction, a left-right direction, and a vertical direction are the same as directions with respect to a vehicle body unless otherwise specified. In the drawings, Reference Sign FR denotes the front side of the vehicle body, Reference Sign UP denotes the upper side of the vehicle body, and Reference Sign LH denotes the left side of the vehicle body.

First Embodiment

FIG. 1 is a left side view of a motorcycle 1 according to a first embodiment of the present invention.

The motorcycle 1 is a scooter type saddle-ride type vehicle including a vehicle body frame 10, a steering system 11 that steerably supports a front wheel 2, a power unit 12 supported by a rear portion of the vehicle body frame 10, a rear wheel 3, and a seat 13 on which an occupant sits astride the seat.

Further, the motorcycle 1 includes a vehicle body cover 14 that covers a vehicle body such as the vehicle body frame 10.

Figure 2:
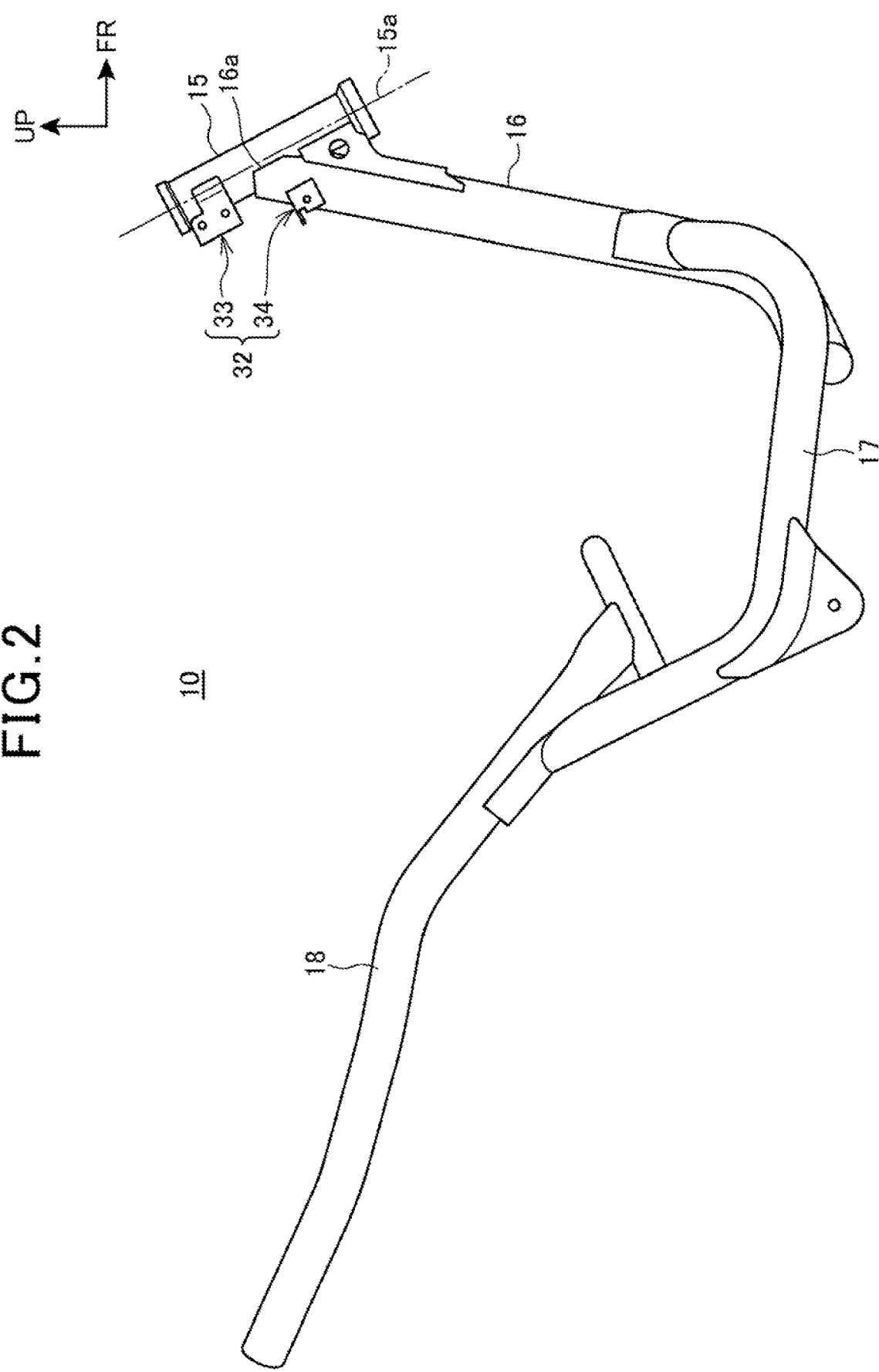
FIG. 2 is a right side view of a vehicle body frame.

FIG. 2 is a right side view of the vehicle body frame 10.

Referring to FIGS. 1 and 2, the vehicle body frame 10 includes a head pipe 15 provided at a front end portion of the vehicle body frame 10, a down frame 16 extending rearward and downward from a rear side of the head pipe 15, a pair of left and right lower frames 17 extending rearward from a lower end portion of the down frame 16, and a pair of left and right seat frames 18 extending rearward and upward from rear end portions of the lower frames 17.

The head pipe 15 and the down frame 16 are positioned at the center of a vehicle width similarly to the front wheel 2.

The power unit 12 is a unit swing engine including an engine as a drive source of the rear wheel 3 and a swingarm supporting the rear wheel 3 in a swingable manner, the engine and the swingarm being integrated with each other. The power unit 12 is supported by the vehicle body frame 10 in a swingable manner via a link mechanism (not illustrated) provided at a front portion of the power unit 12.

A rear suspension 20 is stretched between a rear portion of the seat frame 18 and a rear end portion of the power unit 12.

A storage box (not illustrated) supported by the seat frame 18 is disposed below the seat 13. The seat 13 is supported by the seat frame 18 via the storage box.

A pair of left and right step floors 21 having a plate shape and on which feet of the occupant sat on the seat 13 are placed are provided in front of and below the seat 13, and cover the lower frame 17 from above.

The steering system 11 includes a pair of front forks 11a disposed on the left and right sides of the front wheel 2, a bridge member 11b connecting upper end portions of the left and right front forks 11a in a vehicle width direction, a steering shaft 11c extending upward from the center of the bridge member 11b and rotatably supported by the head pipe 15, a handlebar post 11d fixed to an upper end portion of the steering shaft 11c, and a steering handlebar 11e fixed to an upper end of the handlebar post 11d.

An axis 15a of the head pipe 15 is inclined rearward with respect to a vertical direction in a vehicle side view. An axis of rotation of the steering shaft 11c coincides with the axis 15a. The handlebar post 11d obliquely extends rearwards and upwards from the head pipe 15 side along the axis 15a.

The front wheel 2 is supported by an axle 2a connecting lower end portions of the front forks 11a in a left-right direction.

A front fender 22 that covers the front wheel 2 from above is fixed to the front forks 11a.

Figure 3:
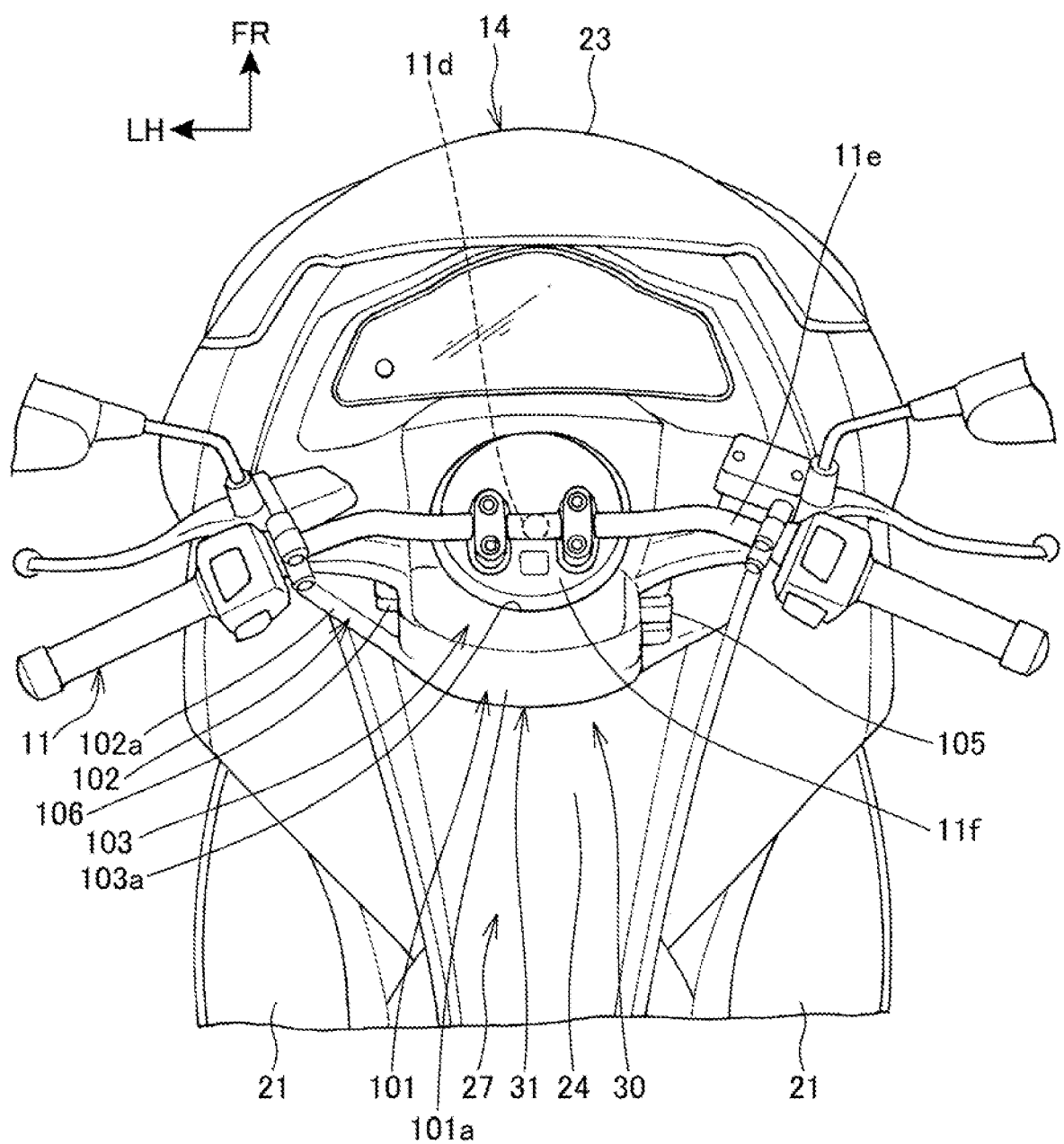
FIG. 3 is a view of a front portion of the motorcycle as viewed from above on an occupant side.

FIG. 3 is a view of a front portion of the motorcycle 1 as viewed from above on an occupant side.

Referring to FIGS. 1 and 3, the vehicle body cover 14 includes a front cover 23 that covers the steering system 11 and the head pipe 15 from the front side, an inner cover 24 that covers the steering system 11 and the head pipe 15 from the rear side, a lower cover 25 that covers the lower frame 17 from the outer side below the step floors 21, and a side cover 26 that covers the seat frame 18 from the outer side below the seat 13.

In the vehicle side view, a straddling space 27 recessed downward when viewed from the side of the vehicle is defined between the inner cover 24 and a front end portion of the seat 13. When getting on and off the motorcycle 1, the occupant can straddle the motorcycle 1 through the straddling space 27.

Referring to FIGS. 1 and 3, the motorcycle 1 includes an airbag device 30 that reduces an impact on the occupant.

The airbag device 30 includes an airbag unit 31, an acceleration sensor (not illustrated) that detects an impact on the motorcycle 1, and an airbag control device (not illustrated) that controls the operation of the airbag unit 31 based on a detection result of the acceleration sensor.

The airbag unit 31 is disposed on the rear side of the inner cover 24 and is positioned in front of the occupant sat on the seat 13. The airbag unit 31 is provided behind the head pipe 15 and below the handlebar 11e, and is positioned at a front side of the straddling space 27.

A rear portion of the airbag unit 31 is exposed from a notch portion provided in a central portion of the inner cover 24 to the straddling space 27 positioned on the outside of the vehicle body cover 14.

Figure 4:
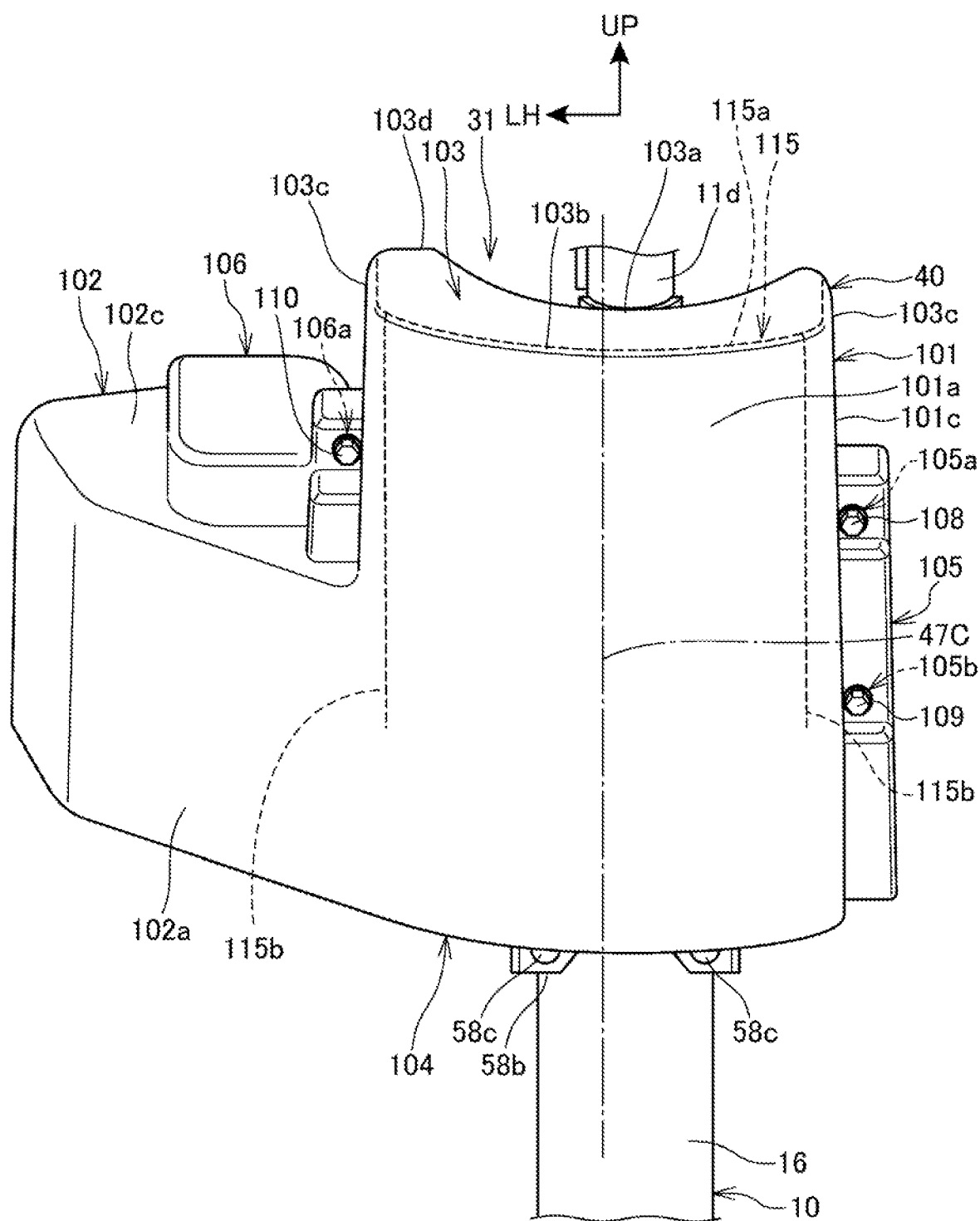
FIG. 4 is a view of an airbag unit attached to the vehicle body frame as viewed from a rear side.
Figure 5:
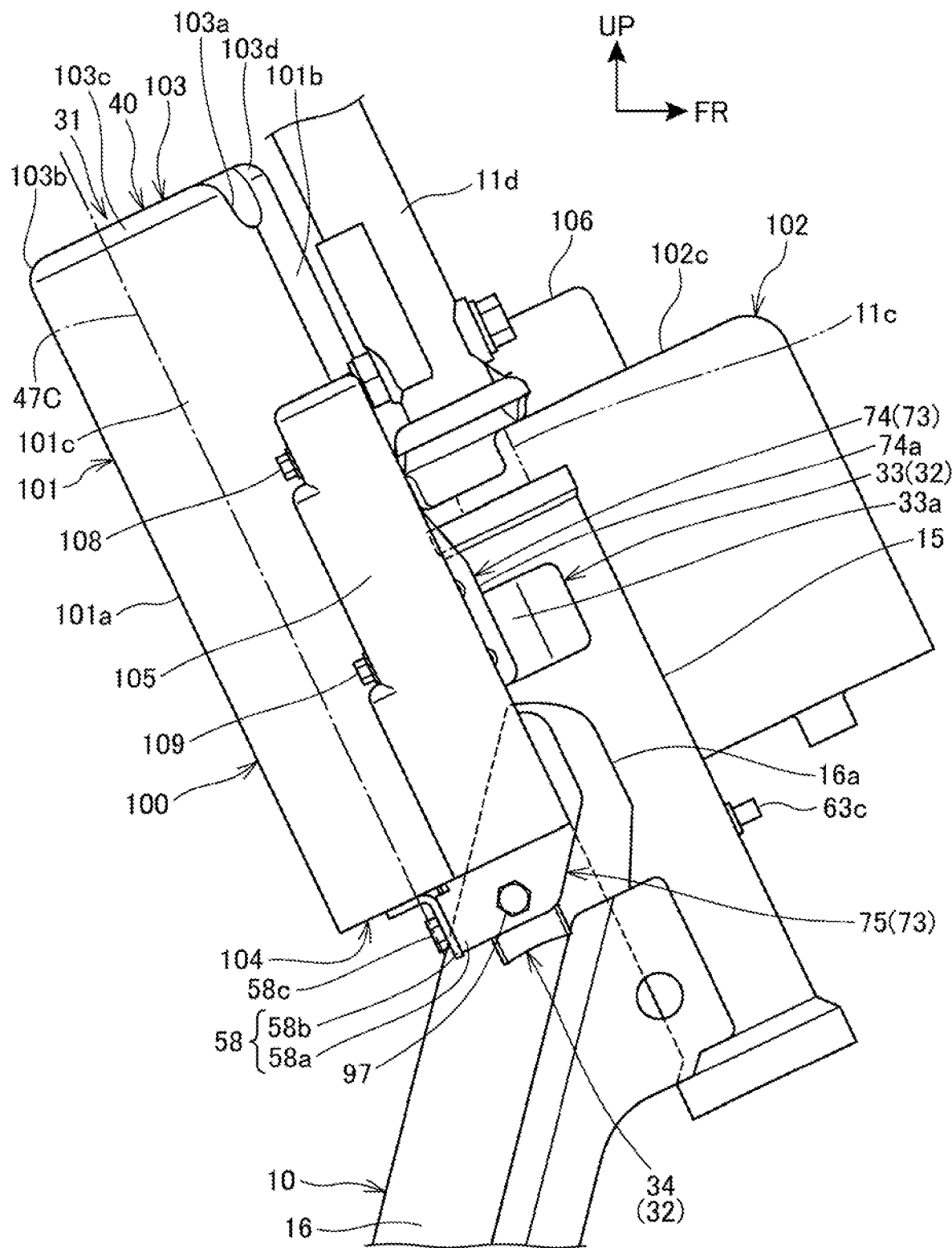
FIG. 5 is a right side view of the airbag unit attached to the vehicle body frame.
Figure 6:
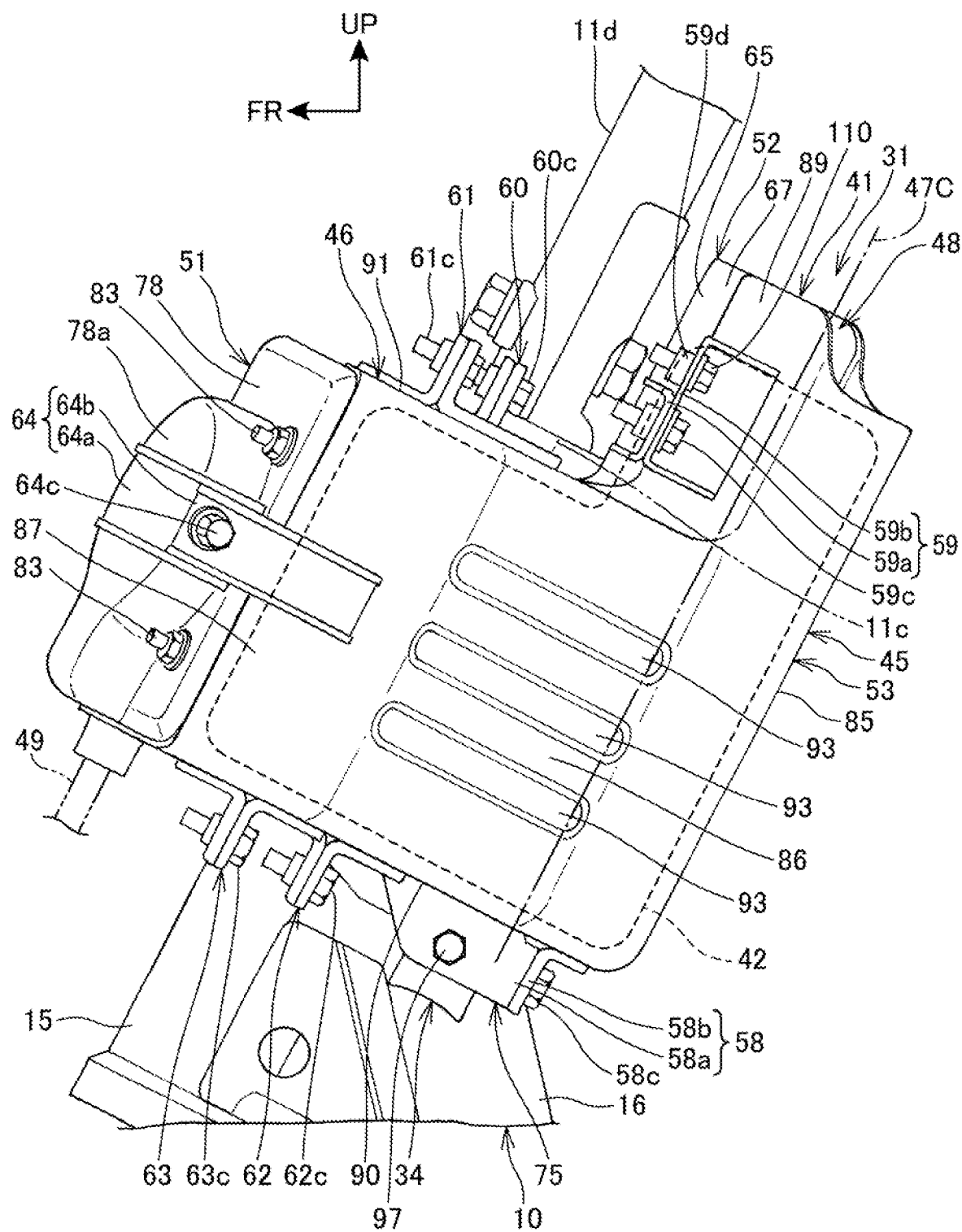
FIG. 6 is a left side view of the airbag unit in a state in which an exterior member is removed.

FIG. 4 is a view of the airbag unit 31 attached to the vehicle body frame 10 as viewed from the rear side. FIG. 5 is a right side view of the airbag unit 31 attached to the vehicle body frame 10. FIG. 6 is a left side view of the airbag unit 31 in a state in which an exterior member 40 is removed.

The airbag unit 31 is disposed behind the head pipe 15 and the handlebar post 11d, and is disposed in such a way as to be inclined rearward along the rear side of the head pipe 15 in the vehicle side view.

The airbag unit 31 is fixed to a stay 32 (see FIG. 2) provided at the front end portion of the vehicle body frame 10.

Referring to FIGS. 2 and 5, the stay 32 includes a first stay 33 provided at an upper portion of the head pipe 15 and a second stay 34 provided at an upper portion of the down frame 16.

The first stay 33 is provided above a connecting portion 16a between the head pipe 15 and an upper end of the down frame 16.

The second stay 34 is disposed below the first stay 33.

Figure 7:
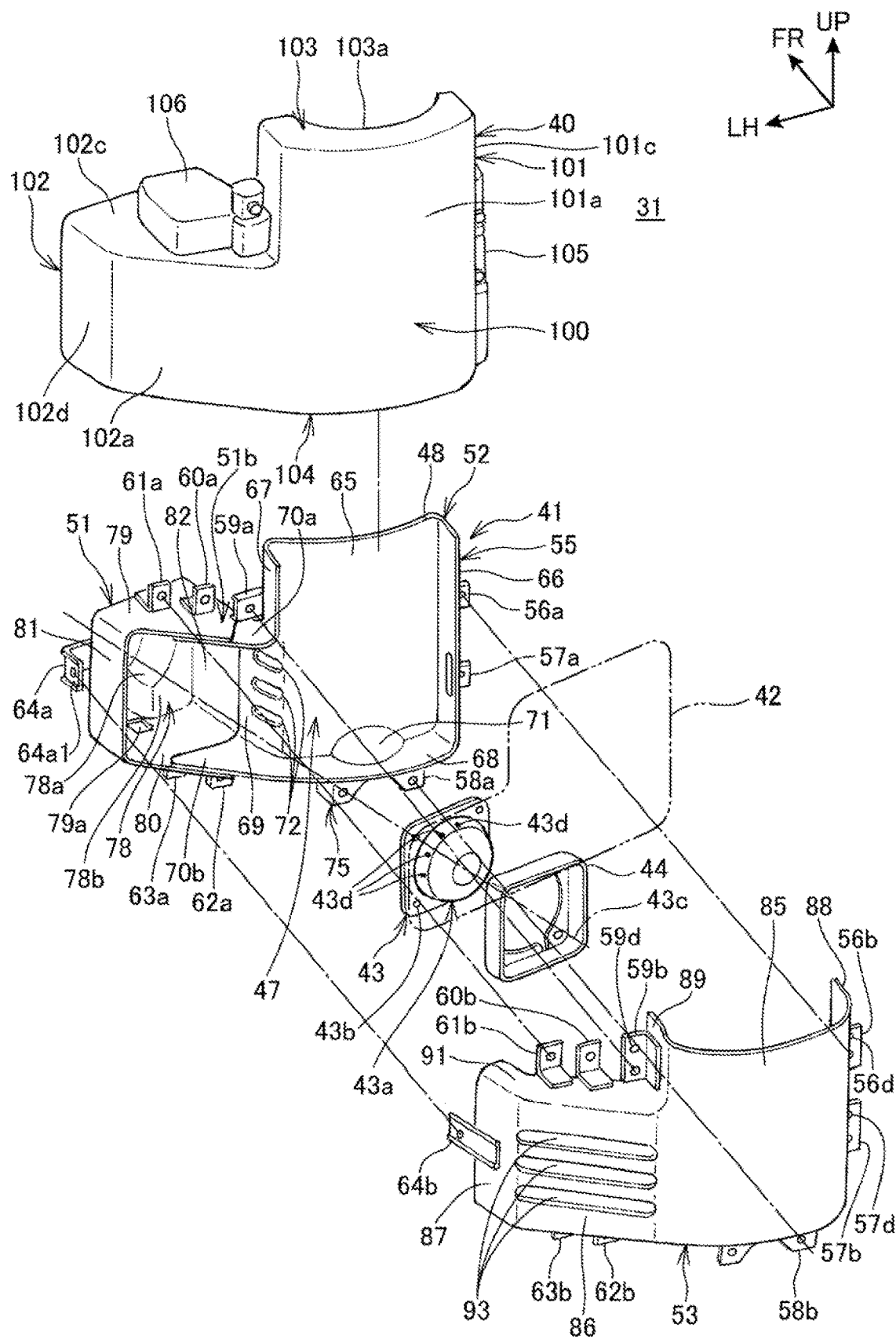
FIG. 7 is an exploded perspective view of the airbag unit.

FIG. 7 is an exploded perspective view of the airbag unit 31.

The airbag unit 31 includes a box-shaped retainer 41 provided in front of the occupant sat on the seat 13 (see FIG. 1), an airbag 42 housed in the retainer 41, an inflator 43 that discharges gas into the airbag 42, a fixing member 44 that fixes the inflator 43 and the airbag 42 to the retainer 41, and the exterior member 40 that covers the retainer 41 from the outer side.

The retainer 41 of the present embodiment is formed in a box shape by assembling a plurality of parts. The retainer 41 is configured by assembling an inflator accommodating portion 51 covering the inflator 43 from the front side, a retainer front half 52 provided behind the head pipe 15, and a retainer rear half 53 provided on the occupant side and joining with the retainer front half 52 and the inflator accommodating portion 51 from the rear side.

The inflator accommodating portion 51 and the retainer front half 52 are coupled and integrated by welding, for example. The inflator accommodating portion 51 and the retainer front half 52 are coupled to form a front case 55 constituting substantially a front half of the retainer 41.

The retainer rear half 53 is a rear case constituting substantially a rear half of the retainer 41.

The retainer 41 is formed by coupling the retainer rear half 53 to the front case 55 from the rear side.

In FIG. 4, the retainer 41 is a box-shaped member formed in an inverted L shape when viewed from the occupant side (the rear side of the vehicle). Note that, in the following description, an L shape means an L shape when the retainer 41 is viewed from the front side or the rear side. The retainer 41 has an inverted L shape when viewed from the rear side, but it can be said that the retainer 41 is formed in an L shape.

The retainer 41 is fixed to the front end portion of the vehicle body frame 10 via the stay 32 (see FIG. 2), and is positioned behind the head pipe 15 and the down frame 16.

Referring to FIGS. 4 to 6, the retainer 41 includes a vertically extending portion 45 (see FIG. 6) extending vertically, and a side extending portion 46 (see FIG. 6) extending outward in the vehicle width direction from a lower side of the vertically extending portion 45.

The vertically extending portion 45 is a box-shaped portion extending in the vertical direction along the head pipe 15, and is inclined rearward in the vehicle side view. The vertically extending portion 45 is positioned at the center of the vehicle width and overlaps with upper end portions of the handlebar post 11d, the head pipe 15, and the down frame 16 from the rear side.

The side extending portion 46 is a box-shaped portion extending in the vehicle width direction. The side extending portion 46 passes through the outer side of the head pipe 15 from the side portion of the vertically extending portion 45 and extends outward in the vehicle width direction and forward.

The retainer 41 is formed in an L shape in which the side extending portion 46 extends from the vertically extending portion 45. An L-shaped airbag passage 47 (see FIG. 7) formed by an internal space of the vertically extending portion 45 and an internal space of the side extending portion 46 is formed inside the retainer 41.

An opening 48 (see FIGS. 6 and 7) for exposing the airbag passage 47 upward is formed at an upper portion of the vertically extending portion 45. The airbag 42 is deployed upward from the opening 48.

The inflator 43 is disposed in the side extending portion 46 and is disposed offset outward in the vehicle width direction with respect to the head pipe 15 positioned at the center of the vehicle width.

Parts of the retainer front half 52 of the retainer 41, the inflator accommodating portion 51, and the retainer rear half 53 of the retainer 41 will be described.

As illustrated in FIG. 7, the retainer front half 52 includes a substantially rectangular front wall portion 65 that is vertically long. The front wall portion 65 constitutes a front side surface of the vertically extending portion 45. A lower wall portion 68 extending rearward is formed at a lower edge of the front wall portion 65. A first side wall 66 extending rearward is formed at an edge of one of the left and right sides of the front wall portion 65. A second side wall 67 extending rearward is formed at an upper portion of an edge of the other one of the left and right sides of the front wall portion 65.

An extending wall portion 69 extending toward the side extending portion 46 and the front side of the vehicle is formed at a lower portion of the edge of the other one of the left and right sides of the front wall portion 65. The extending wall portion 69 is continuous with a lower portion of the front wall portion 65. An extending portion upper wall 70a extending outward in the vehicle width direction and rearward is formed at an upper edge of the extending wall portion 69. The extending portion upper wall 70a is continuous with a lower end of the second side wall 67. An extending portion lower wall 70b extending outward in the vehicle width direction and rearward is formed at a lower edge of the extending wall portion 69. The extending portion lower wall 70b is continuous with a side portion of the lower wall portion 68.

A recess 71 formed by denting the retainer front half 52 rearward is formed at a lower end portion of the retainer front half 52. The recess 71 is a portion where a lower end portion of the front wall portion 65 and a front portion of the lower wall portion 68 are recessed toward the inside of the retainer 41. The recess 71 is provided at a central portion of the front wall portion 65 in a width direction. A rear portion of an upper end portion of the down frame 16 is positioned in the recess 71. Therefore, a lower end portion of the retainer 41 can be disposed close to the down frame 16, and the retainer 41 can be disposed compactly.

A rib-shaped step portion 72 protruding toward the inside of the retainer 41 is provided on an inner surface of the extending wall portion 69. The step portion 72 is formed to be longer in the left-right direction than in the vertical direction and extends in the left-right direction in the retainer 41. A plurality of step portions 72 are arranged side by side in the vertical direction. The step portion 72 is formed by pushing out a portion of the extending wall portion 69 from the outside to the inside of the retainer 41.

As illustrated in FIG. 5, a fastening portion 73 for fastening the retainer 41 to the stay 32 of the vehicle body frame 10 is provided at a front surface of the front wall portion 65 of the retainer front half 52. The fastening portion 73 includes a first fastening member 74 fastened to the first stay 33 of the head pipe 15 and a second fastening member 75 fastened to the second stay 34 of the down frame 16. The first fastening member 74 is fastened to the first stay 33 by a fixing tool (not illustrated). The second fastening member 75 is fastened to the second stay 34 by a pair of left and right fixing tools 97 (see FIGS. 5 and 6).

As illustrated in FIG. 7, the inflator accommodating portion 51 is connected to the retainer front half 52. The inflator accommodating portion 51 is a box-shaped part whose rear portion is opened rearward. The inflator accommodating portion 51 includes a substantially rectangular wall portion 78 covering the inflator 43 from the front side. An upper wall portion 79 extending rearward is formed at an upper edge of the wall portion 78. A lower wall portion 80 extending rearward is formed at a lower edge of the wall portion 78. An outer side wall portion 81 extending rearward is formed at an outer side edge of the wall portion 78 in the vehicle width direction. An inner side wall portion 82 extending rearward is formed on an inner side edge of the wall portion 78 in the vehicle width direction.

The upper wall portion 79 overlaps with the extending portion upper wall 70a of the retainer front half 52 from above, the lower wall portion 80 overlaps with the extending portion lower wall 70b of the retainer front half 52 from below, and the inner side wall portion 82 overlaps with the extending wall portion 69 of the retainer front half 52 from the inner side in the vehicle width direction.

The inflator accommodating portion 51 is welded to the retainer front half 52 by a welded fixing portion 51b (fixing portion) which is a portion where the upper wall portion 79, the lower wall portion 80, and the inner side wall portion 82 overlap with the retainer front half 52 from the outer side.

A main body accommodating portion 78a (see FIG. 6) formed by making a central portion of the wall portion 78 bulge forward is formed in the wall portion 78 of the inflator accommodating portion 51. A receiving surface portion 78b for receiving the inflator 43 is formed around the main body accommodating portion 78a. A plurality of fixing hole portions (not illustrated) penetrating in the thickness direction are formed in the receiving surface portion 78b.

A tubular inflator main body 43a of the inflator 43 that ejects gas is accommodated in the main body accommodating portion 78a. In the inflator 43, a flange portion 43b extending in a radial direction from an outer circumference of a rear portion of the inflator main body 43a abuts on the receiving surface portion 78b. The flange portion 43b is sandwiched between the receiving surface portion 78b and the frame-shaped fixing member 44. The inflator 43 is fastened to an inner surface of the wall portion 78 by a fixing tool 83 (see FIG. 6) inserted into the fixing hole portions (not illustrated) of the fixing member 44, the flange portion 43b, and the receiving surface portion 78b. The wall portion 78 is an inflator support portion that supports the inflator 43.

The inflator 43 is disposed on the inner surface of the wall portion 78 in a direction in which an axis 43c of the tubular inflator main body 43a is directed in the front-rear direction of the vehicle in the vehicle side view. The wall portion 78 to which the flange portion 43b is fixed is slightly inclined rearward with respect to the vertical direction in the vehicle side view. Therefore, the axis 43c extends rearward and downward in the vehicle side view. Here, the inclination of the axis 43c in the vehicle side view is smaller than 45° with respect to the horizontal. Further, the inflator 43 is disposed in a direction in which the axis 43c becomes closer to the center of the vehicle width toward the rear side of the vehicle in plan view viewed from above.

The inflator 43 ejects gas from a plurality of gas ejection ports 43d (see FIG. 7) provided in the outer circumference of the inflator main body 43a behind the flange portion 43b. The frame-shaped fixing member 44 surrounds the gas ejection ports 43d. The gas ejected from the gas ejection ports 43d is guided by an inner surface of the fixing member 44 to flow rearward.

A wire passage hole 79a is provided in the lower wall portion 80 of the inflator accommodating portion 51. A wire 49 (see FIG. 6) connecting the inflator 43 to the airbag control device passes through the wire passage hole 79a.

As illustrated in FIG. 7, the retainer rear half 53 includes a substantially rectangular rear wall portion 85 that is a vertically long plate. The rear wall portion 85 constitutes a rear side surface of the vertically extending portion 45. A side rear wall portion 86 extending outward in the vehicle width direction is formed at a lower-left portion of the rear wall portion 85. The side rear wall portion 86 constitutes a rear side surface of the side extending portion 46. An extending portion side wall 87 extending forward and outward in the vehicle width direction is formed at an edge portion of the outer side of the side rear wall portion 86 in the vehicle width direction.

A first side wall 88 extending forward from a side edge of a side opposite from the side extending portion 46 is formed at a side edge of one of the left and right sides of the rear wall portion 85. The second side wall 89 extending forward from a side edge of a side adjacent to the side extending portion 46 is formed at a side edge of the other one of the left and right sides of the rear wall portion 85. The second side wall 89 is formed at an upper portion of the rear wall portion 85.

Furthermore, the retainer rear half 53 includes a lower wall portion 90 (see FIG. 6) extending forward from a lower edge of the rear wall portion 85, a lower edge of the side rear wall portion 86, and a lower edge of the extending portion side wall 87, and an extending portion upper wall 91 extending forward from an upper edge of the side rear wall portion 86 and an upper edge of the extending portion side wall 87. The extending portion upper wall 91 is continuous with a lower end of the second side wall 89.

The side rear wall portion 86 of the retainer rear half 53 faces a rear surface 43e of the inflator main body 43a. The axis 43c of the inflator main body 43a intersects the side rear wall portion 86 of the retainer 41.

A stepped shape 93 protruding toward the inside of the retainer 41 is provided on an inner surface of the side rear wall portion 86. The stepped shape 93 is formed in a rib shape longer in the left-right direction than in the vertical direction, and extends in the left-right direction in the retainer 41.

A plurality of stepped shapes 93 are arranged side by side in the vertical direction. The plurality of stepped shapes 93 arranged side by side in the vertical direction guide a flow of the gas ejected from the inflator 43 in the vehicle width direction.

The stepped shape 93 is formed by pushing out a portion of the side rear wall portion 86 from the outside to the inside of the retainer 41.

Next, fixing portions of the front case 55 and the retainer rear half 53 will be described.

The retainer front half 52 of the front case 55 includes the first fixing piece 56*a* and the second fixing piece 57*a* extending outward in the vehicle width direction from the first side wall 66. Correspondingly, the retainer rear half 53 includes the first fixing piece 56*b* and the second fixing piece 57*b* extending outward in the vehicle width direction from the first side wall 88. The first fixing piece 56*a* and the first fixing piece 56*b* constitute first fixing portions 56*a* and 56*b*. The first fixing piece 56*a* and the first fixing piece 56*b* are fastened to each other by fasteners (not illustrated) inserted into the first fixing portions 56*a* and 56*b* from the rear side. The second fixing piece 57*a* and the second fixing piece 57*b* constitute second fixing portions 57*a* and 57*b*. The second fixing piece 57*a* and the second fixing piece 57*b* are fastened to each other by fasteners (not illustrated) inserted into the second fixing portions 57*a* and 57*b* from the rear side.

The retainer front half 52 includes a third fixing piece 58*a* extending downward from the lower wall portion 68. The third fixing piece 58*a* is a connecting portion of the second fastening member 75, and is formed integrally with the second fastening member 75. Corresponding to the third fixing piece 58*a*, the retainer rear half 53 includes a third fixing piece 58*b* extending downward from a lower portion of the rear wall portion 85 in the lower wall portion 90. The third fixing piece 58*a* and the third fixing piece 58*b* constitute a third fixing portion 58 (see FIG. 6). The third fixing piece 58*a* and the third fixing piece 58*b* are fastened to each other by a fastener 58*c* (see FIG. 6) inserted into the third fixing portion 58 from the rear side.

The retainer front half 52 includes a fourth fixing piece 59*a* extending outward in the vehicle width direction from the second side wall 67. Correspondingly, the retainer rear half 53 includes a fourth fixing piece 59*b* extending outward in the vehicle width direction from the second side wall 89. The fourth fixing piece 59*a* and the fourth fixing piece 59*b* constitute a fourth fixing portion 59 (see FIG. 6). The fourth fixing piece 59*a* and the fourth fixing piece 59*b* are fastened to each other by a fastener 59*c* inserted into the fourth fixing portion 59 from the rear side.

The inflator accommodating portion 51 of the front case 55 includes a fifth fixing piece 60*a* and a sixth fixing piece 61*a* extending upward from the upper wall portion 79. Correspondingly, the retainer rear half 53 includes a fifth fixing piece 60*b* and a sixth fixing piece 61*b* extending upward from the extending portion upper wall 91. The fifth fixing piece 60*a* and the fifth fixing piece 60*b* constitute a fifth fixing portion 60 (see FIG. 6). The fifth fixing piece 60*a* and the fifth fixing piece 60*b* are fastened to each other by a fastener 60*c* (see FIG. 6) inserted into the fifth fixing portion 60 from the rear side.

The sixth fixing piece 61*a* and the sixth fixing piece 61*b* constitute a sixth fixing portion 61 (see FIG. 6). The sixth fixing piece 61*a* and the sixth fixing piece 61*b* are fastened to each other by a fastener 61*c* (see FIG. 6) inserted into the sixth fixing portion 61 from the rear side.

The inflator accommodating portion 51 includes a seventh fixing piece 62*a* and an eighth fixing piece 63*a* extending downward from the lower wall portion 80. Correspondingly, the retainer rear half 53 includes a seventh fixing piece 62*b* and an eighth fixing piece 63*b* extending downward from a lower portion of the side rear wall portion 86 in the lower wall portion 90. The seventh fixing piece 62*a* and the seventh fixing piece 62*b* constitute a seventh fixing portion 62 (see FIG. 6). The seventh fixing piece 62*a* and the seventh fixing piece 62*b* are fastened to each other by a fastener 62*c* (see FIG. 6) inserted into the seventh fixing portion 62 from the rear side. The eighth fixing piece 63*a* and the eighth fixing piece 63*b* constitute an eighth fixing portion 63 (see FIG. 6). The eighth fixing piece 63*a* and the eighth fixing piece 63*b* are fastened to each other by a fastener 63*c* inserted into the eighth fixing portion 63 from the rear side.

The inflator accommodating portion 51 includes a ninth fixing piece 64*a* extending outward in the vehicle width direction from a front surface of the wall portion 78. A distal end portion 64*a*1 of the ninth fixing piece 64*a* is bent rearward, and the distal end portion 64*a*1 is positioned outside the outer side wall portion 81. Corresponding to the ninth fixing piece 64*a*, the retainer rear half 53 includes a ninth fixing piece 64*b* extending forward from the extending portion side wall 87. The ninth fixing piece 64*a* and the ninth fixing piece 64*b* constitute a ninth fixing portion 64 (see FIG. 6). The ninth fixing piece 64*a* and the ninth fixing piece 64*b* are fastened to each other by a fastener 64*c* (see FIG. 6) inserted into the ninth fixing portion 64 from the outer side.

The retainer 41 can be separated into the front case 55 and the retainer rear half 53 by fastening and unfastening the fixing portions 56*a* to 57*b* and 53 to 64. This contributes to improvement in assemblability of the airbag device 30.

By fastening the fixing portions 56*a* to 57*b* and 53 to 64, the front case 55 and the retainer rear half 53 are fastened to form the retainer 41.

In a state in which the fixing portions 56*a* to 57*b* and 53 to 64 are fastened, the retainer rear half 53 overlaps with the front case 55 from the outer side. That is, in a state where the fixing portions 56 to 64 are fastened, the first side wall 88 overlaps with the first side wall 66 from the outer side, the second side wall 89 overlaps with the second side wall 67 from the outer side, the lower wall portion 90 overlaps with the lower wall portion 68, the extending portion lower wall 70*b*, and the lower wall portion 80 from the outer side, the extending portion upper wall 91 overlaps with the extending portion upper wall 70*a* and the upper wall portion 79 from the outer side, and the extending portion side wall 87 overlaps with the outer side wall portion 81 from the outer side.

The airbag 42 is housed in the L-shaped airbag passage 47 in the retainer 41 in a folded state, and is provided from the side extending portion 46 to the vertically extending portion 45.

An upstream end of the airbag 42 in the gas flow is sandwiched between the fixing member 44 and the flange portion 43*b*, whereby the airbag 42 is connected to the inflator 43.

The exterior member 40 is attached to the retainer 41. The exterior member 40 is formed in such a way as to cover substantially the entire surface of the retainer 41 except for a lower surface of the retainer 41. The exterior member 40 includes a cover 100 that covers the retainer 41, and a lid portion 103 (*lid*) that covers the opening 48 at the upper surface of the retainer 41 from above, the cover 100 and the lid portion 103 being integrated with each other. The cover 100 is provided on a lower side of the lid portion 103. The cover 100 includes a vertically extending portion cover portion 101 that covers the vertically extending portion 45 and a side extending portion cover portion 102 that covers the side extending portion 46, the vertically extending portion cover portion 101 and the side extending portion cover portion 102 being integrated with each other. A lower opening portion 104 that opens a space inside the cover 100 downward is formed in a lower surface of the cover 100. The lower opening portion 104 is provided in the entire lower surface of the exterior member 40. The exterior member 40 is attached to the retainer 41 by covering the retainer 41 from above through the lower opening portion 104.

As illustrated in FIG. 4, in a first side surface portion 101c of an opposite side of the vertically extending portion cover portion 101 from the side extending portion 46, a fixing portion housing portion 105 formed by making a portion of the first side surface portion 101c bulge outward in the vehicle width direction is provided. The first fixing portions 56a and 56b (see FIG. 7) and the second fixing portions 57a and 57b (see FIG. 7) are housed in the fixing portion housing portion 105.

A first attachment hole 105a penetrating through a front surface of the fixing portion housing portion 105 is provided in an upper portion of the front surface of the fixing portion housing portion 105. A cover fastener 108 is inserted into the first attachment hole 105a. The cover fastener 108 is fastened to a first cover fixing hole portion 56d (see FIG. 7) provided in an upper portion of the first fixing piece 56b.

A second attachment hole 105b penetrating through the front surface of the fixing portion housing portion 105 is provided in the front surface of the fixing portion housing portion 105 below the first attachment hole 105a. A cover fastener 109 is inserted into the second attachment hole 105b. The cover fastener 109 is fastened to a second cover fixing hole portion 57d provided in an upper portion of the second fixing piece 57b.

On a side upper surface portion 102c of the side extending portion cover portion 102, a fixing portion housing portion 106 formed by making a portion of the side upper surface portion 102c bulge upward is provided.

The fourth fixing portion 59, the fifth fixing portion 60, and the sixth fixing portion 61 are housed in the fixing portion housing portion 106. A third attachment hole 106a (see FIG. 7) penetrating through a front surface of the fixing portion housing portion 106 is provided in the front surface. A cover fastener 110 is inserted into the third attachment hole 106a. The cover fastener 110 is fastened to a third cover fixing hole portion 59d (see FIG. 6) provided in an upper portion of the fourth fixing piece 59b.

The exterior member 40 is fastened to the retainer 41 by the cover fasteners 108, 109, and 110. The exterior member 40 of the present embodiment is engaged with a claw portion (not illustrated) provided on the front surface of the retainer 41, and is attached to the retainer 41 in a state where a front portion of the exterior member 40 is prevented from coming off upward.

Referring to FIG. 3, a handlebar holder 11f that supports the handlebar 11e is provided at an upper end portion of the handlebar post 11d. The handlebar holder 11f has a disk shape in plan view viewed from above, and the handlebar 11e is fixed to an upper surface of the handlebar holder 11f.

The airbag unit 31 is disposed in such a way that the lid portion 103 of the exterior member 40 is arranged behind the handlebar holder 11f.

The lid portion 103 of the exterior member 40, a rear surface portion 101a, a side rear surface portion 102a, the fixing portion housing portion 105, and the fixing portion housing portion 106 are exposed to the straddling space 27.

A lid recessed portion 103a recessed downward is provided at a front portion of the lid portion 103 to avoid a rear portion of the handlebar holder 11f. A front edge of the lid recessed portion 103a is formed in an arc shape in accordance with the shape of the rear portion of the handlebar holder 11f.

The rear portion of the handlebar holder 11f is disposed in the lid recessed portion 103a. Therefore, the lid portion 103 can be disposed close to the handlebar holder 11f in the front-rear direction of the vehicle.

As illustrated in FIG. 4, the exterior member 40 includes a tear line 115 as a cleavage portion broken by the deployed airbag 42.

The tear line 115 is a groove-shaped fragile portion formed to have a plate thickness smaller than a plate thickness of a portion of the exterior member 40 around the tear line 115.

The tear line 115 is formed to have a small plate thickness and preferentially cleaves.

The tear line 115 includes a rear edge 103b of the lid portion 103, left and right side edges 103c of the lid portion 103, and a lid-side tear line 115a provided in a portion excluding a portion of the lid recessed portion 103a in a front edge 103d of the lid portion 103. The tear line 115 includes a pair of left and right rear tear lines 115b extending downward along the left and right side edges of the rear surface portion 101a from portions of the left and right end portions of the rear edge 103b in the lid-side tear line 115a. Furthermore, the tear line 115 includes a pair of left and right front tear lines (not illustrated) extending downward along the left and right side edges of a front surface portion 101b from the left and right end portions of the front edge 103d in the lid-side tear line 115a.

The exterior member 40 covers a range from the upper end portion to the lower end portion of the retainer 41, and covers substantially the entire retainer 41 except for the lower surface and a lower-left portion of the front surface of the retainer 41 from the outer side. Here, the upper end portion of the retainer 41 is the opening 48, and the lower end portion of the retainer 41 is lower edges of the rear wall portion 85 and the side rear wall portion 86.

Therefore, the retainer 41 can be entirely covered from above and surrounded by the exterior member 40, and the waterproofness of the retainer 41 can be improved.

In the airbag device 30 of the present embodiment, the inflator 43 ejects gas into the airbag 42 toward the rear side of the vehicle along the axis 43c under the control of the airbag control device.

The gas discharged from the inflator 43 into the airbag 42 is guided by the side extending portion 46 and the vertically extending portion 45, and flows in an L shape in the airbag passage 47.

At this time, a part of the gas ejected from the inflator 43 hits the stepped shape 93 of the side extending portion 46 via the airbag 42 and flows inward in the vehicle width direction along the stepped shape 93.

When the gas flows from the side extending portion 46 to the vertically extending portion 45, the flow in the left-right direction is changed to the flow in the upward direction, and the gas flows upward in the vertically extending portion 45.

When the airbag 42 inflates upward by the gas flowing upward in the vertically extending portion 45, the tear line 115 of the exterior member 40 cleaves, the lid portion 103 is opened, and the opening 48 is exposed. Then, the airbag 42 is deployed upward from the opening 48 as illustrated in FIG. 1 by the gas flowing upward.

The retainer 41 is fastened to the down frame 16 at a lower side position of the retainer 41 via the second fastening member 75. As a result, the support rigidity of a lower portion of the retainer 41 with respect to the vehicle body frame 10 side is increased, and when the airbag 42 inflates by the gas, a portion of an upper portion of the retainer 41 on the opening 48 side slightly moves toward the occupant side with a portion of the second fastening member 75 as a fulcrum due to the inflation of the airbag 42, and is deformed to widen the opening 48. Therefore, the airbag 42 can be satisfactorily deployed upward.

Figure 8:
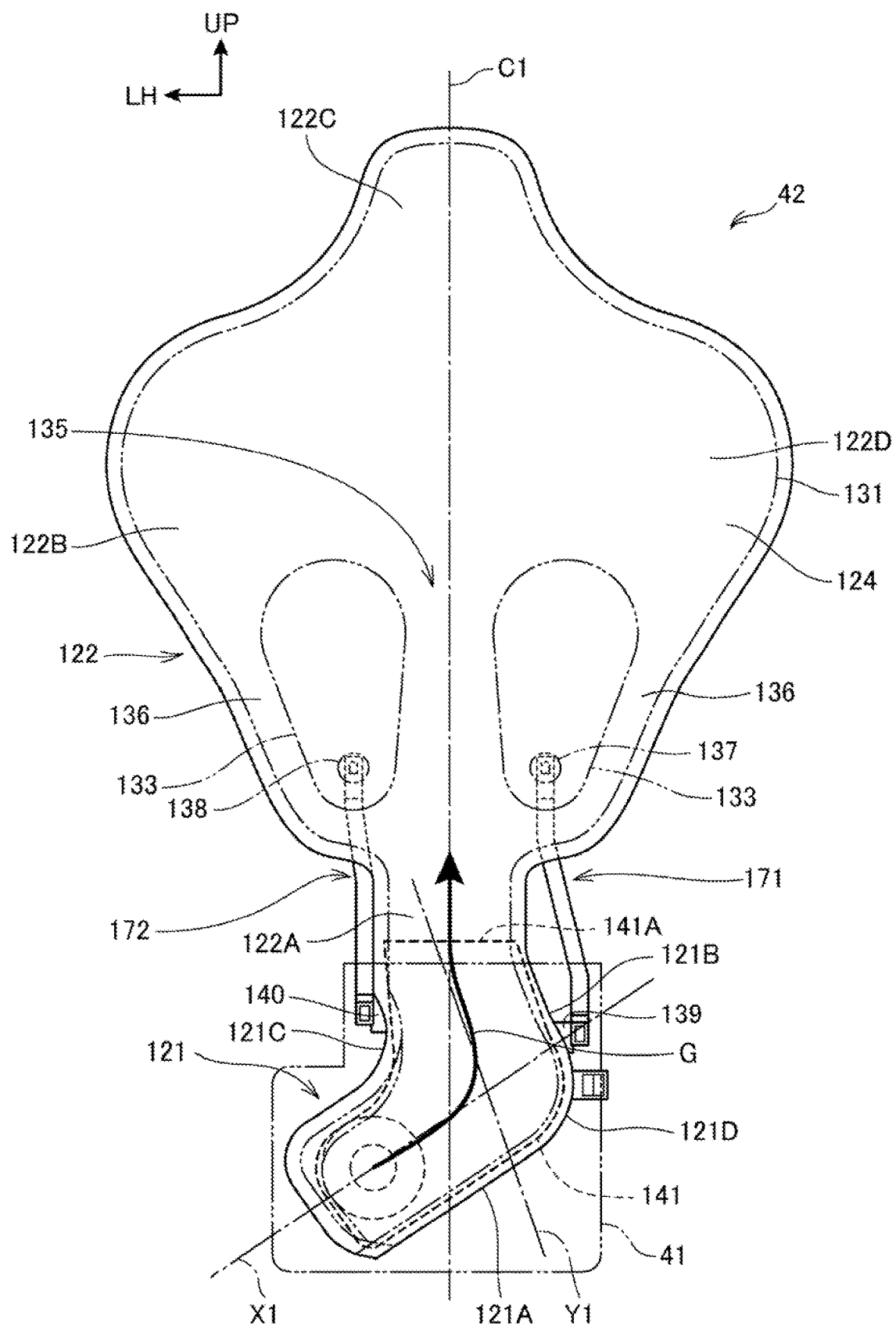
FIG. 8 is a view of a deployed and inflating airbag as viewed from the rear side (corresponding to the occupant side).
Figure 9:
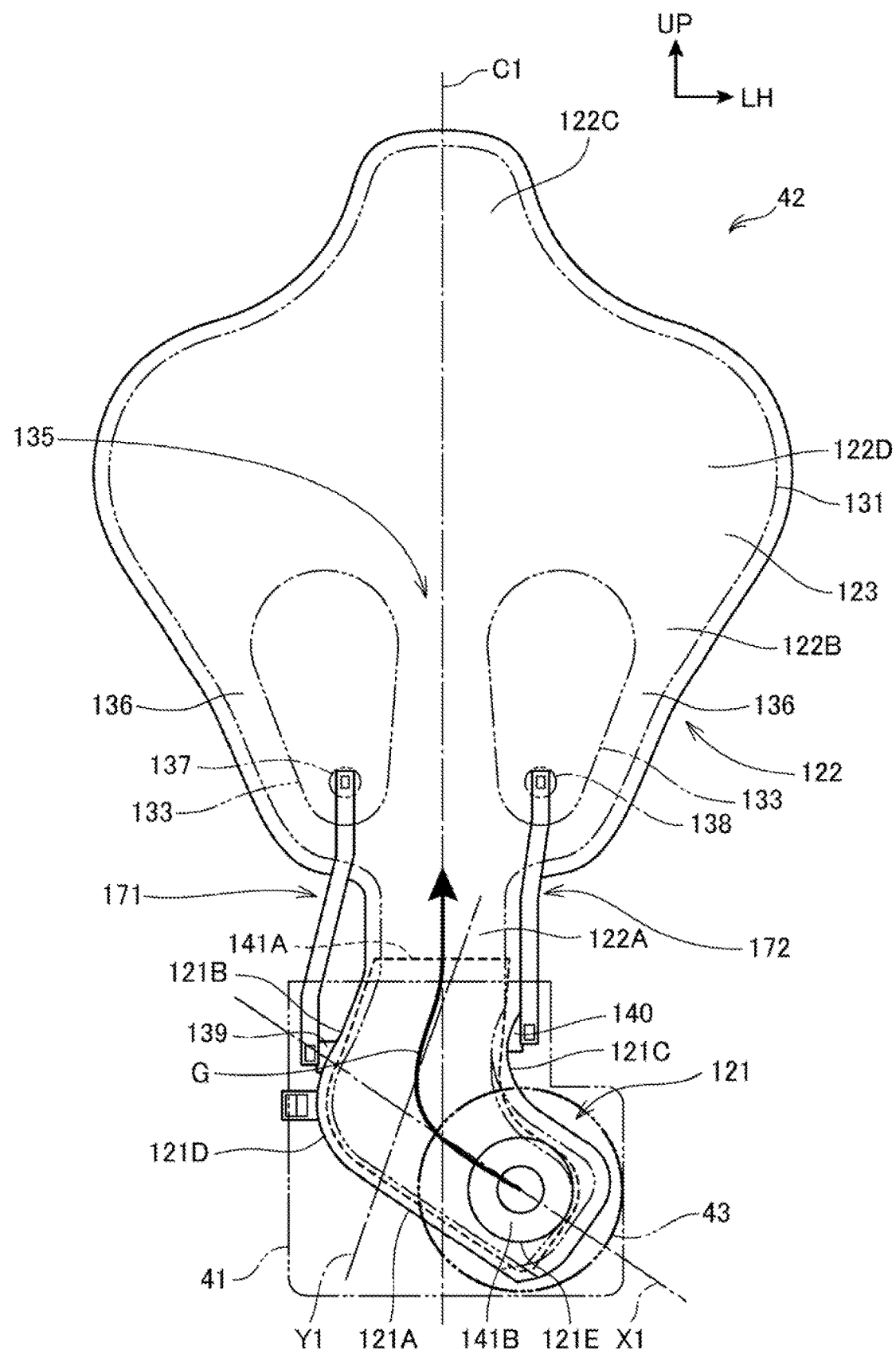
FIG. 9 is a view of the deployed and inflating airbag as viewed from a front side (a side opposite from an occupant).

FIG. 8 is a view of the deployed and inflating airbag 42 as viewed from the rear side (corresponding to the occupant side). FIG. 9 is a view of the deployed and inflating airbag 42 as viewed from the front side (a side opposite from the occupant).

The airbag 42 is a bag including a proximal end portion 121 positioned in the airbag passage 47 (see FIG. 7) of the retainer 41 in a deployed state and an outward deployment portion 122 positioned outside the airbag passage 47 in a deployed state, the proximal end portion 121 and the outward deployment portion 122 being integrated with each other.

The outward deployment portion 122 is formed bilaterally symmetrically with respect to a center line (left-right center line) C1 of the outward deployment portion 122 in the width direction (left-right direction). The airbag 42 is disposed in such a way that the center line C1 is positioned on the left side of the center of the vehicle width. The airbag 42 is disposed in such a way that the center line C1 is at the same position as a center line 47C (see FIGS. 4 to 6) of the vertically extending portion 45 of the retainer 41 in the vehicle width direction.

The outward deployment portion 122 includes a neck portion 122A extending upward from an upper end of the proximal end portion 121, a deployment portion main body 122B extending upward from an upper end of the neck portion 122A, and a bulging portion 122C bulging upward from the center of the upper portion of the deployment portion main body 122B in the width direction.

The neck portion 122A is a cylindrical portion extending in the vertical direction from the opening 48 of the retainer 41 in a state where the airbag 42 is operated and deployed.

The deployment portion main body 122B is formed in a fan shape extending upward and having a width in the left-right direction increasing from a lower end which is a connecting portion with the neck portion 122A. The deployment portion main body 122B includes a head facing portion 122D having the maximum width in the left-right direction at an upper end portion thereof. The head facing portion 122D is a portion assumed to receive the head of the occupant in a state where the airbag 42 is operated and deployed.

The neck portion 122A, the deployment portion main body 122B, and the bulging portion 122C are provided bilaterally symmetrically with respect to the center line C1.

The airbag 42 of the present embodiment is formed in a bag shape by a joining structure of a front base fabric (front surface) 123 (see FIG. 9) and a rear base fabric (rear surface) 124 (see FIG. 8). A sewn portion (coupling portion) 131 for forming the joining structure in which the front base fabric 123 and the rear base fabric 124 are sewn together is formed at peripheral edge portions of the front base fabric 123 and the rear base fabric 124.

The deployment portion main body 122B includes a pair of middle sewn portions 133 and 133 at positions between the neck portion 122A and the head facing portion 122D.

The middle sewn portions 133 and 133 are provided bilaterally symmetrically with respect to the center line C1.

The middle sewn portions 133 and 133 are portions where the front base fabric 123 and the rear base fabric 124 of the outward deployment portion 122 are sewn and connected along peripheral edge portions of the middle sewn portions 133 and 133, and the gas G does not pass through the middle sewn portions 133 and 133.

A throttle portion 135 in which the passage of the gas G becomes narrower than that on the upstream side is formed between the left and right middle sewn portions 133 and 133. In addition, throttle portions 136 and 136 in which the passage of the gas G becomes narrower than that on the upstream side are formed between left and right side portions of the outward deployment portion 122 and the middle sewn portions 133 and 133.

Since the passage of the gas G on the upstream side of the head facing portion 122D become narrower by the throttle portion 135, 136, and 136, the gas G is quickly supplied to the head facing portion 122D.

Figure 10:
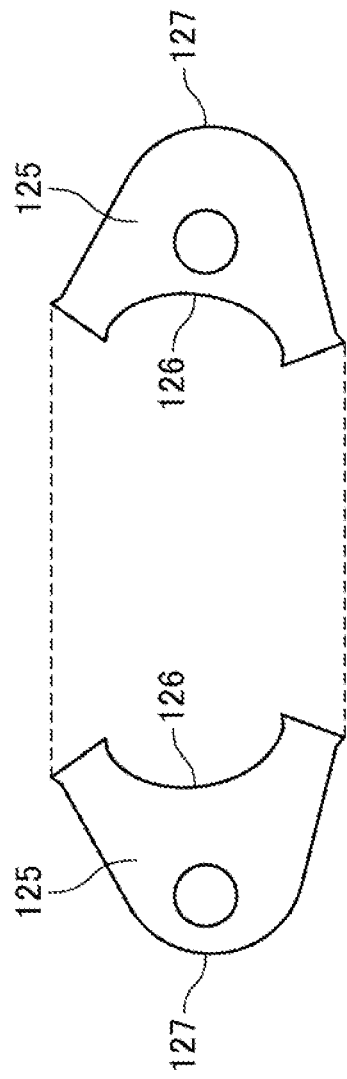
FIG. 10 is an explanatory view of panels forming a circumferential length difference.

FIG. 10 is an explanatory view of panels 125 and 125 forming a circumferential length difference.

In the airbag 42 of the present embodiment, the panels 125 and 125 forming a circumferential length difference between the front base fabric 123 and the rear base fabric 124 when viewed from the side are sewn to the sewn portion 131 of the front base fabric 123 and the rear base fabric 124. The panels 125 and 125 are formed of fabric similarly to the front base fabric 123 and the rear base fabric 124. A pair of panels 125 and 125 are provided on the left and right sides of the neck portion 122A. In FIG. 10, the left panel 125 is illustrated in a left side view, and the right panel 125 is illustrated in a right side view. The panels 125 and 125 are configured to be bilaterally symmetrical. The panels 125 and 125 are substantially D-shaped in a side view. Each of the panels 125 and 125 includes a front edge portion 126 and a rear edge portion 127 facing the front edge portion 126. In a side view, the front edge portion 126 and the rear edge portion 127 are formed in an arc shape recessed rearward, and the front edge portion 126 has a shorter circumferential length than the rear edge portion 127.

The peripheral edge portion of the front base fabric 123 and the front edge portion 126 of the panel 125 are sewn while facing each other. The circumferential length of the peripheral edge portion of the front base fabric 123 corresponds to the circumferential length of the front edge portion 126 of the panel 125 in a side view at a portion sewn to the panel 125.

A peripheral edge portion of the rear base fabric 124 and the rear edge portion 127 of the panel 125 are sewn while facing each other. The circumferential length of the peripheral edge portion of the rear base fabric 124 corresponds to the circumferential length of the rear edge portion 127 of the panel 125 in a side view at a portion sewn to the panel 125.

In the neck portion 122A of the outer deployment portion 122, the front base fabric 123 is shorter, and the rear base fabric 124 is longer. Since there is a circumferential length difference between the front base fabric 123 and the rear base fabric 124 in a direction along the center line C1, the airbag 42 is easily deployed in a state of being bent toward a certain front side of the front base fabric 123 in the direction along the center line C1 at the time of deployment.

The neck portion 122A is a cylindrical portion extending in the vertical direction from the opening 48 of the retainer 41, and is positioned below the handlebar 11e in the vehicle side view in a deployed state. Therefore, the airbag 42 is deployed in a state in which the panels 125 formed at the neck portion 122A are positioned below the handlebar 11e in the vehicle side view. As a result, the airbag 42 can be deployed while suppressing interference with the handlebar 11e.

In particular, the panel 125 in the present embodiment is disposed upstream of the deployment portion main body 122B including the head facing portion 122D and greatly expanding in the left-right direction, in a flow direction of the gas G. Therefore, it is possible to deploy the airbag 42 while suppressing the deployment portion main body 122B from interfering with portions of the handlebar 11e positioned on the left and right sides of the handlebar post 11d.

As illustrated in FIGS. 8 and 9, in the airbag 42, the proximal end portion 121 connected to the inflator 43 includes a bag left-right extending portion 121A extending in the left-right direction in the side extending portion 46 of the retainer 41 and a bag upward extending portion 121B extending upward from the bag left-right extending portion 121A.

The bag left-right extending portion 121A extends in the left-right direction from the inflator 43 of the retainer 41 toward the center line C1.

The bag upward extending portion 121B extends upward while being slightly inclined with respect to the center line C1 in the vertically extending portion 45. The outward deployment portion 122 extending upward is continuous with an upper end of the bag upward extending portion 121B.

In the proximal end portion 121, the bag left-right extending portion 121A extends toward one side in the vehicle width direction with respect to the center line C1, and is formed to be bilaterally asymmetrical with respect to the center line C1.

That is, in the airbag 42, the outward deployment portion 122 is bilaterally symmetrical with respect to the center line C1, but the proximal end portion 121 is provided bilaterally asymmetrically with respect to the center line C1 along the L-shaped airbag passage 47.

An angle at which an extending direction X1 of the bag left-right extending portion 121A and an extending direction Y1 of the bag upward extending portion 121B intersect is larger than a right angle. The proximal end portion 121 is formed in an L shape along the airbag passage 47 of the retainer 41.

When housed in the retainer 41, the proximal end portion 121 has a shape curved at a substantially right angle along the airbag passage 47.

In the peripheral edge portion of the proximal end portion 121, curved portions 121C and 121D are formed at a connecting portion between the bag left-right extending portion 121A and the bag upward extending portion 121B. The gas G smoothly flows along the curved portions 121C and 121D.

A connecting port 121E (see FIG. 9) connected to the inflator 43 is provided at a position offset from the center line C1 of the bag left-right extending portion 121A in the vehicle width direction in the front base fabric 123 of the proximal end portion 121.

Figure 11:
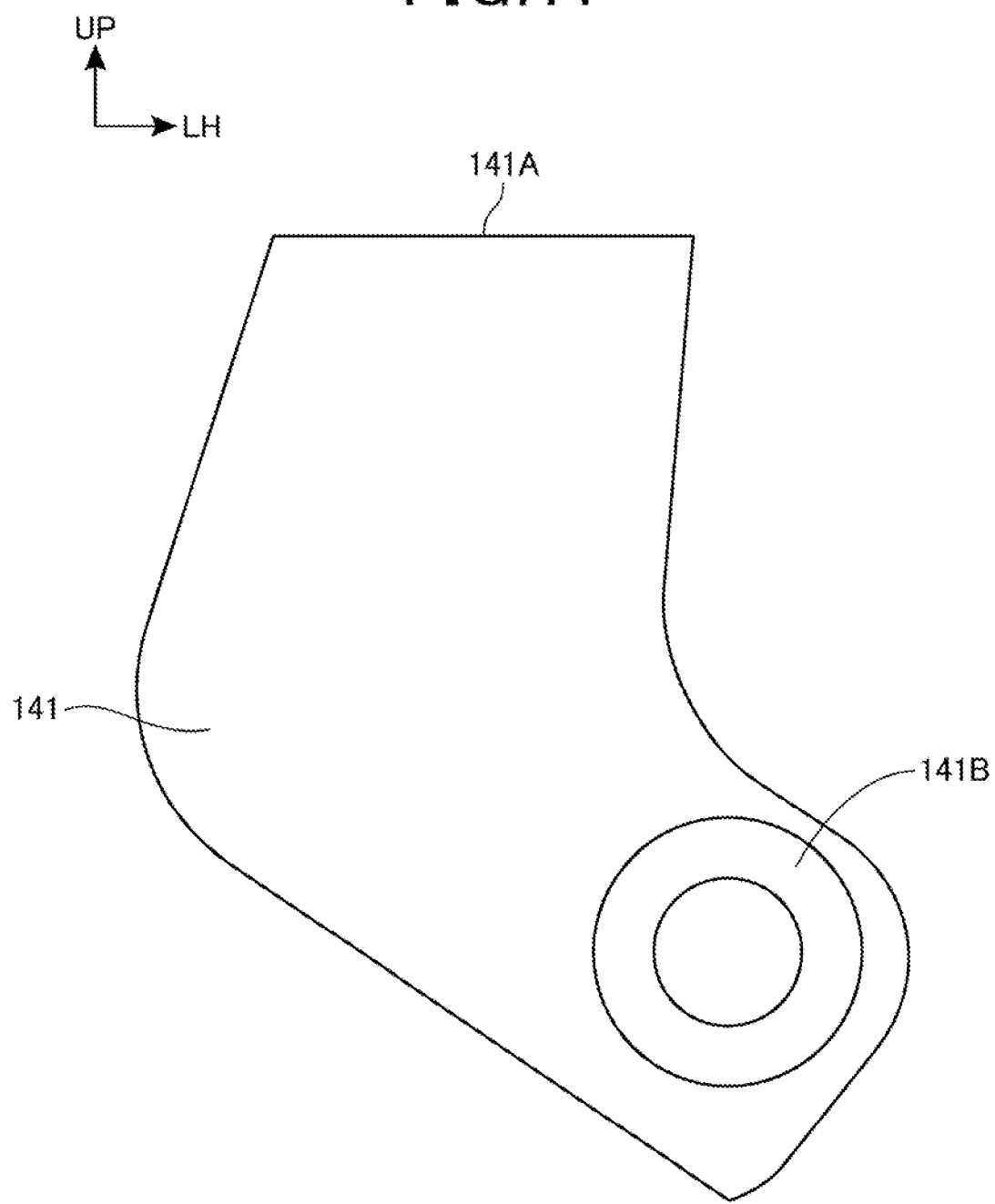
FIG. 11 is a front view of a loop diffuser.

FIG. 11 is a front view of a loop diffuser 141.

The airbag 42 includes the loop diffuser 141 that guides the gas G. The loop diffuser 141 is formed in an L-shaped bag shape including an opening 141A at one end thereof. A peripheral edge portion of the loop diffuser 141 is closed except for the opening 141A.

The loop diffuser 141 is disposed in the gas flow path of the proximal end portion 121 and extends from the inflator 43 to a lower end portion of the outward deployment portion 122. The loop diffuser 141 is coupled to the airbag 42 by being sewn to an inner surface of the proximal end portion 121.

The loop diffuser 141 includes a connecting portion 141B connected to the inflator 43. The connecting portion 141B is connected to the inflator 43 in such a way as to overlap with the connecting port 121E of the bag left-right extending portion 121A from the inner side. The gas G discharged from the inflator 43 directly flows into the bag of the loop diffuser 141 from the connecting portion 141B. The gas G flowing into the loop diffuser 141 flows along the loop diffuser 141 and flows into the outward deployment portion 122 from the opening 141A.

The opening 141A is disposed in such a way that the gas G discharged from the opening 141A flows upward.

Since the flow direction of the gas G from the inflator 43 can be controlled by the loop diffuser 141, a filling procedure for filling the airbag 42 with the gas G can be controlled, and the airbag 42 can be efficiently deployed upward.

As illustrated in FIGS. 8 and 9, a right pipe portion 137 is formed at a lower portion of an inner peripheral side of the right middle sewn portion 133. A left pipe portion 138 is formed at a lower portion of an inner peripheral side of the left middle sewn portion 133. The pipe portions 137 and 138 sew the front base fabric 123 and the rear base fabric 124 in a circular shape.

A right side tab 139 and a left side tab 140 are provided on the proximal end portion 121. The side tabs 139 and 140 are fabrics separate from the front base fabric 123 and the rear base fabric 124. The side tabs 139 and 140 are disposed between the front base fabric 123 and the rear base fabric 124 and are sewn to the sewn portion 131.

The right side tab 139 is sewn in a state of extending toward one side in the left-right direction from the right curved portion 121D of the proximal end portion 121. The right side tab 139 overlaps with a line L2 passing through the center of the inflator 43 and extending along the longitudinal direction X1 of the bag left-right extending portion 121A in a vehicle front view.

The left side tab 140 is sewn in a state of extending toward the other side in the left-right direction from the left curved portion 121C of the proximal end portion 121. The left side tab 140 is disposed above the right side tab 139 in the vehicle front view.

Anchoring bodies 171 and 172 are disposed between the pipe portions 137 and 138 and the side tabs 139 and 140. The anchoring bodies 171 and 172 are formed of a belt-shaped fabric extending in the vertical direction.

Figure 12:
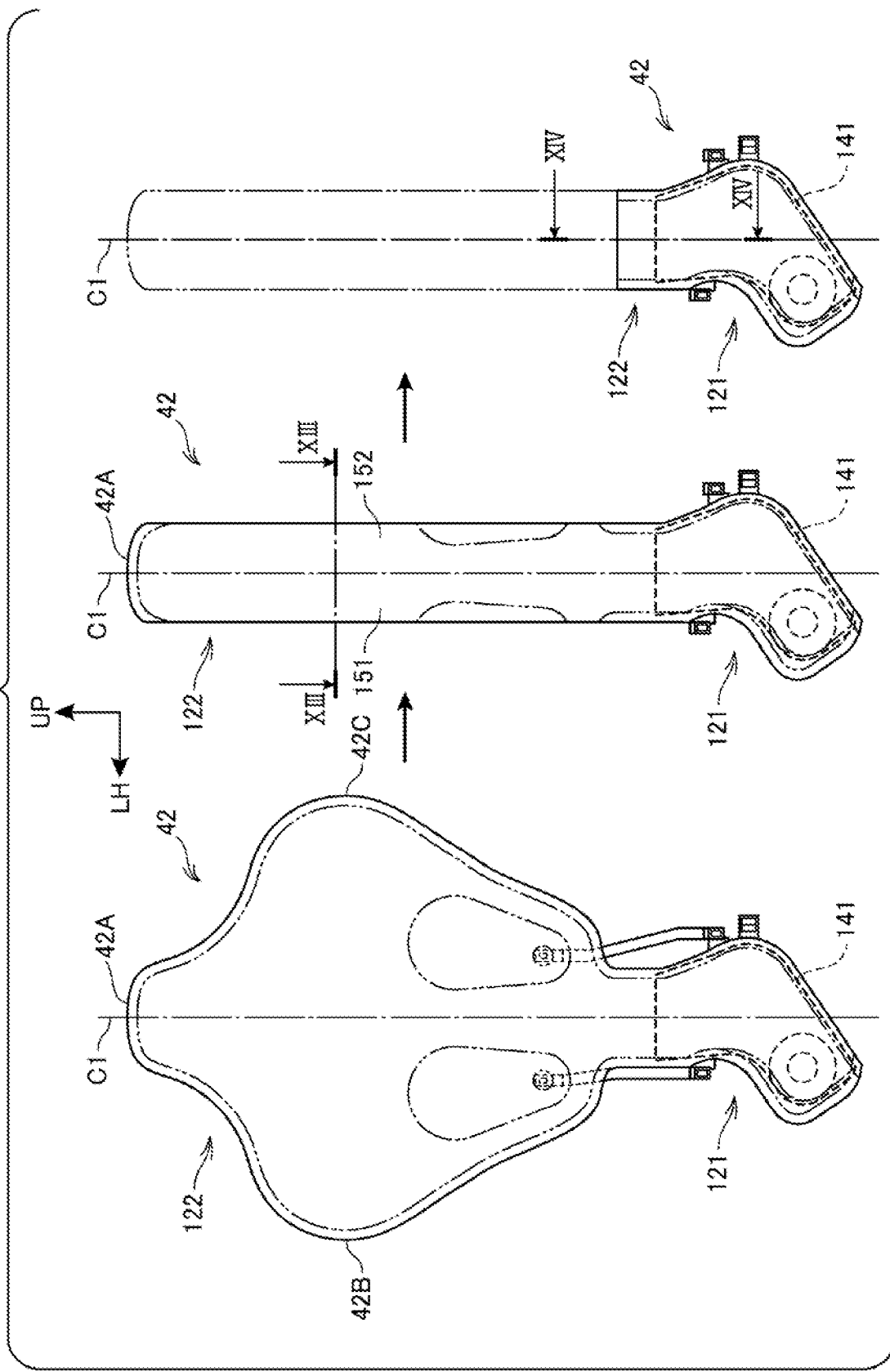
FIG. 12 is an explanatory view of a folding order of the airbag.
Figure 13:
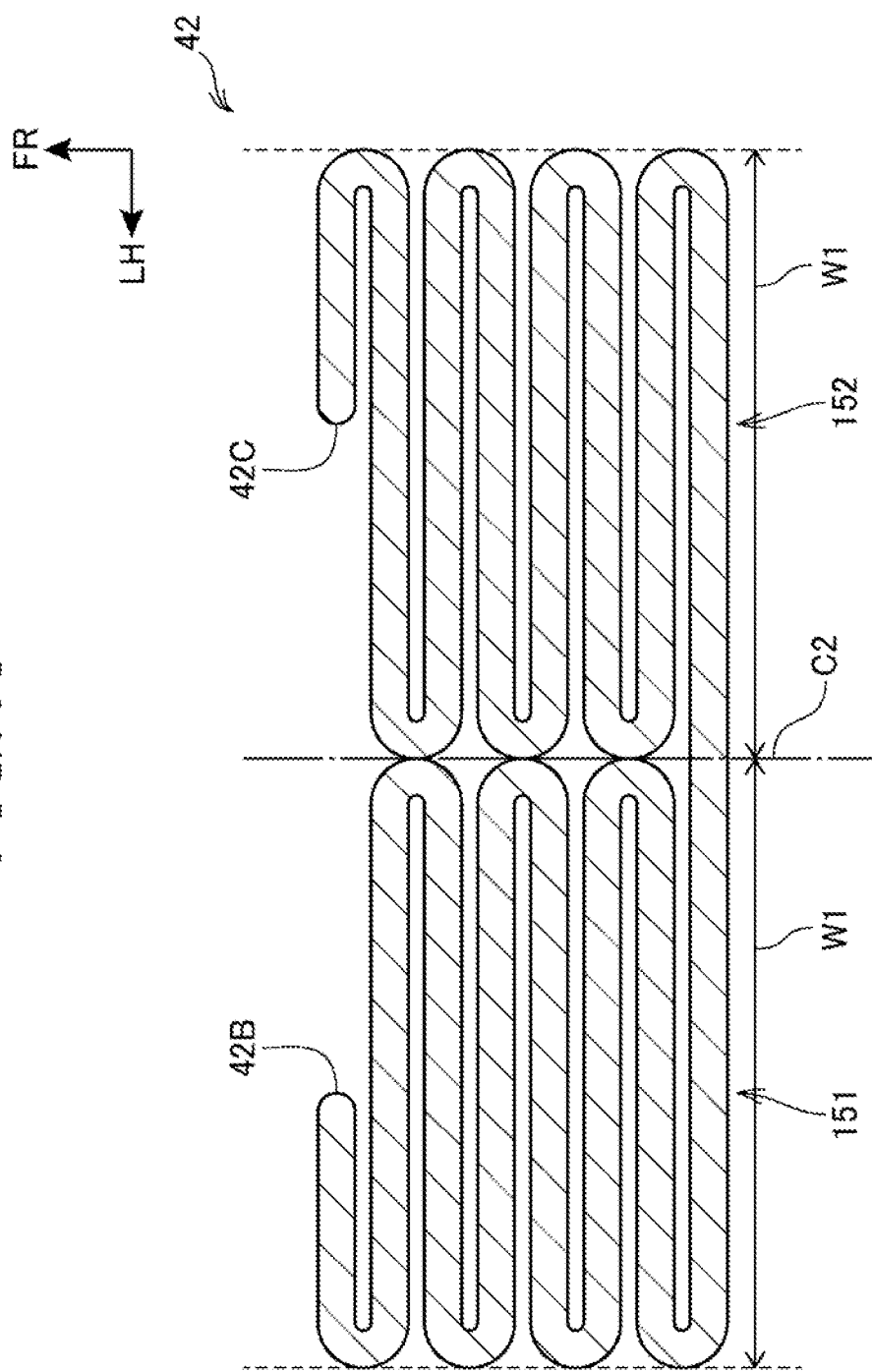
FIG. 13 is a schematic view illustrating a cross section of the airbag in a vehicle top view corresponding to a cross section taken along line XIII-XIII in FIG. 12.
Figure 14:
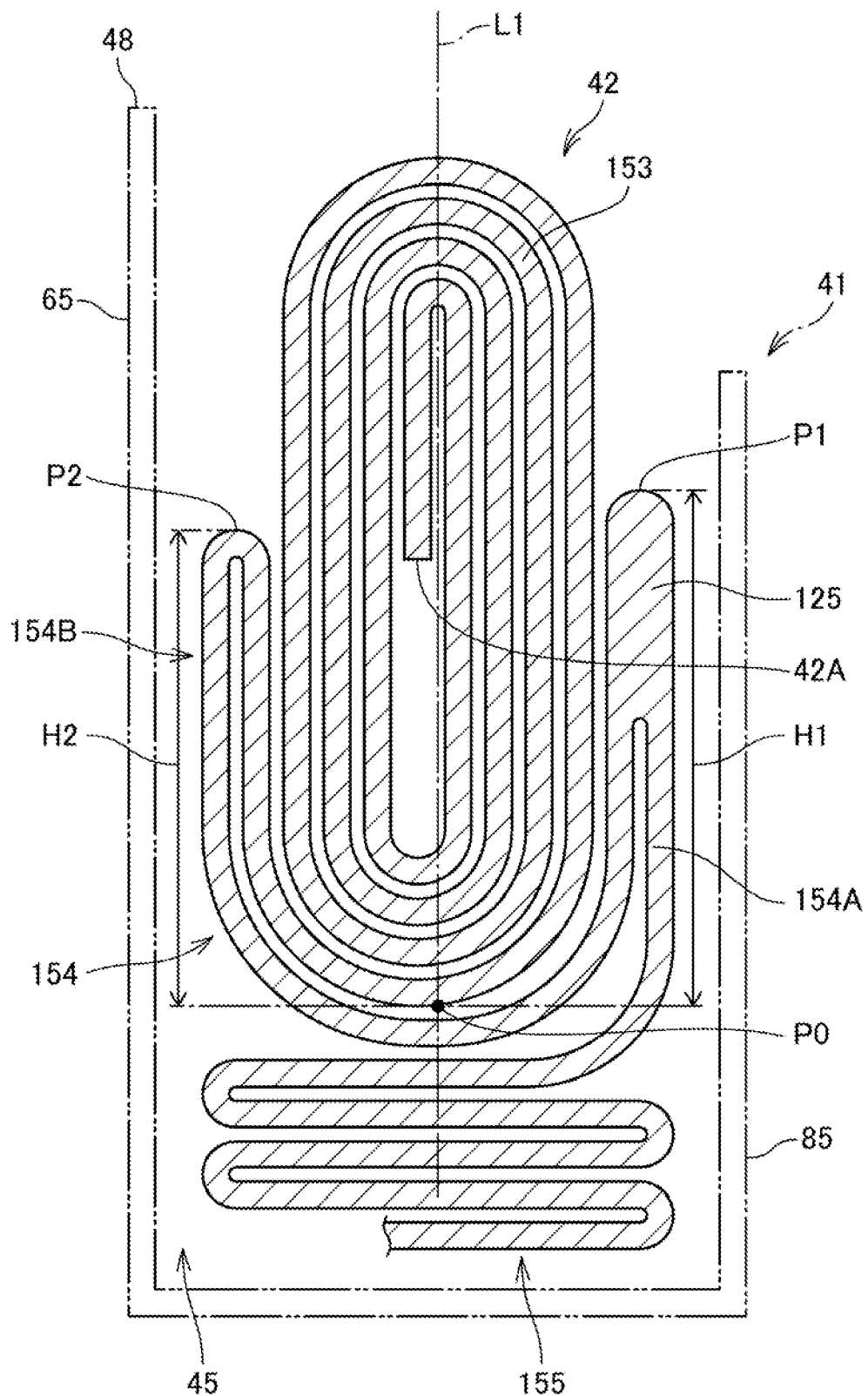
FIG. 14 is a schematic view illustrating a cross section of the airbag in a vehicle side view corresponding to a cross section taken along line XIV-XIV in FIG. 12.

FIG. 12 is an explanatory view of a folding order of the airbag 42. FIG. 13 is a schematic view illustrating a cross section of the airbag 42 in a vehicle top view corresponding to a cross section taken along line XIII-XIII in FIG. 12. FIG. 14 is a schematic view illustrating a cross section of the airbag 42 in a vehicle side view corresponding to a cross section taken along line XIV-XIV in FIG. 12. In FIG. 13, a center line C2 is a center line extending in the front-rear direction orthogonal to the center line C1. That is, the center line C1 corresponds to the center line in the vehicle front view, and the center line C2 corresponds to the center line in the left-right direction in the vehicle top view. In FIGS. 13 and 14, the airbag 42 is schematically illustrated as a single layer structure for convenience of explanation.

The airbag 42 is housed in the retainer 41 in a folded state.

How the airbag 42 is folded will be described with reference to FIGS. 12 to 14.

First, the outward deployment portion 122 is folded in a direction orthogonal to the center line C1 in the vehicle front view. It may be considered that the outward deployment portion 122 is folded in a direction orthogonal to the center line C2 in the vehicle top view. In the present embodiment, the outward deployment portion 122 is folded in a bellows shape bilaterally symmetrically with respect to the center line C1 (C2).

Specifically, a portion of the outward deployment portion 122 that is positioned on a left end 42B side of the center line C1 (C2) is folded forward with a position corresponding to a predetermined length W1 on the left side of the center line C1 (C2) as a folding-back point (folding-back position). Next, the portion of the outward deployment portion 122 that is positioned on the left end 42B side is folded forward with a position corresponding to the center line C1 (C2) as a folding-back point. Then, the portion of the outward deployment portion 122 that is positioned on the left end 42B side is folded forward with the position corresponding to the predetermined length W1 on the left side of the center line C1 (C2) as a folding-back point. In this manner, the portion of the outward deployment portion 122 that is positioned on the left end 42B side is folded forward a plurality of times and folded in a bellows shape with the position corresponding to the predetermined length W1 on the left side of the center line C1 (C2) and the position corresponding to the center line C1 (C2) as the folding-back points.

A portion of the outward deployment portion 122 that is positioned on the right end 42C side is folded in the same manner as the portion of the outward deployment portion 122 that is positioned on the left end 42B side except that the portion of the outward deployment portion 122 that is positioned on the right end 42C side is laterally reversed. That is, the portion of the outward deployment portion 122 that is positioned on the right end 42C side is folded forward a plurality of times and folded in a bellows shape with a position corresponding to the predetermined length W1 on the right side of the center line C1 (C2) and the position corresponding to the center line C1 (C2) as folding-back points.

As a result, as illustrated in FIG. 13, a pair of left and right bellows-shaped portions 151 and 152 are formed in the airbag 42. The sum of the width (length) W1 of the bellows-shaped portion 151 in the left-right direction and the width W1 of the bellows-shaped portion 152 in the left-right direction is a width at which the airbag 42 can be accommodated in the vertically extending portion 45 of the retainer 41.

In the present specification, folding the outward deployment portion 122 in a bellows shape refers to folding performed in such a way as to overlapping linearly extending portions while switching a folding-back direction.

Next, the outward deployment portion 122 is folded in a direction along the center line C1. That is, the bellows-shaped portions 151 and 152 are folded in a direction along the center line C1 of the airbag 42. In the present embodiment, an upper end 42A is bent forward and formed in a roll shape by a preset number of turns (a preset number of times). In the present specification, folding the outward deployment portion 122 in a roll shape refers to folding performed in such a way as to fold back an end portion of the outward deployment portion 122 or the folding-back point of the outward deployment portion 122 as an end portion, and roll the folded-back portion in a certain direction in such a way as to wrap the folded-back portion. As a result, a distal end-side folded portion 153 folded in a roll shape is formed in the airbag 42. A virtual line L1 in the longitudinal direction is formed along a folded portion including the upper end 42A in a cross section in the vehicle side view on the distal end-side folded portion 153. In the present embodiment, the virtual line L1 extends in the vertical direction.

After the distal end-side folded portion 153 is formed, the distal end-side folded portion 153 is folded back in the opposite direction (downward) on the front side. As a result, a second folding-back point P2 is formed on the front side of the distal end-side folded portion 153, and a second folded-back portion 154B is formed. The second folded-back portion 154B includes a portion extending downward from the second folding-back point P2 along the virtual line L1.

After the second folding-back point P2 is formed, the outward deployment portion 122 is folded in such a way as to wrap the distal end-side folded portion 153, whereby the panel 125 is moved to the rear side of the distal end-side folded portion 153, and folded back in the opposite direction (downward) at the position of the panel 125. As a result, a first folding-back point P1 is formed on the rear side of the distal end-side folded portion 153, and a first folded-back portion 154A is formed. The first folded-back portion 154A includes a portion of the outward deployment portion 122 that extends from the first folding-back point P1 along the virtual line L1.

A portion closer to the proximal end portion 121 than to the first folded-back portion 154A is folded back a plurality of times in the front-rear direction and folded in a bellows shape. As a result, a proximal end-side folded portion 155 is formed below the first folded-back portion 154A.

An intermediate-side folded portion 154 is formed between the proximal end-side folded portion 155 and the distal end-side folded portion 153. The intermediate-side folded portion 154 of the first embodiment includes the first folded-back portion 154A and the second folded-back portion 154B.

The airbag 42 is housed in the vertically extending portion 45 of the retainer 41 in a state of including the proximal end-side folded portion 155, the intermediate-side folded portion 154, and the distal end-side folded portion 153.

At this time, the virtual line L1 in the longitudinal direction of the distal end-side folded portion 153 is disposed along the center line 47C of the vertically extending portion 45. The first folding-back point P1 is disposed adjacent to the rear wall portion (side surface) 85 of the retainer 41, and the first folded-back portion 154A is sandwiched between the distal end-side folded portion 153 and the rear wall portion 85. Further, the second folding-back point P2 is disposed adjacent to the front wall portion (side surface) 65 of the retainer 41, and the second folded-back portion 154B is sandwiched between the distal end-side folded portion 153 and the front wall portion 65.

A connecting portion P0 where the distal end-side folded portion 153 and the intermediate-side folded portion 154 are connected is set to a position where the virtual line L1 of the distal end-side folded portion 153 and the outermost periphery portion of the outward deployment portion 122 of the distal end-side folded portion 153 intersect each other. In this case, a height H1 of the first folding-back point P1 is set to a length from the connecting portion P0 to the first folding-back point P1 along the virtual line L1. A height H2 of the second folding-back point P2 is set to a length from the connecting portion P0 to the second folding-back point P2 along the virtual line L1.

Here, it has been confirmed by experiments that the higher the height H1 of the first folding-back point P1, the more likely the distal end-side folded portion 153 is deployed toward the front of the vehicle when the airbag 42 is deployed. In addition, it has been confirmed by experiments that, the higher the height H2 of the second folding-back point P2, the more likely the distal end-side folded portion 153 is deployed toward the occupant side when the airbag 42 is deployed.

In the present embodiment, the height H1 of the first folding-back point P1 is higher than the height H2 of the second folding-back point P2.

Figure 15:
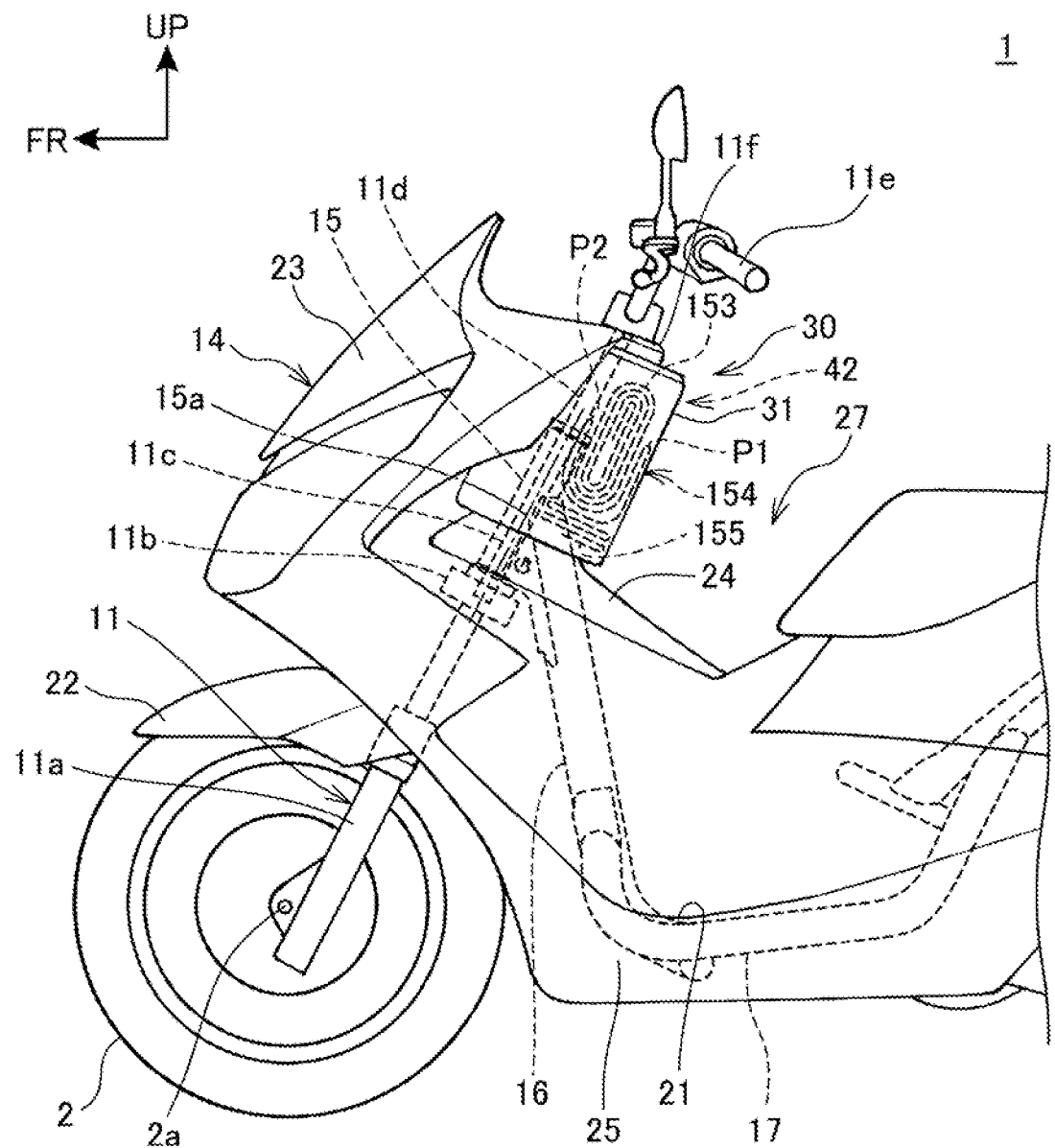
FIG. 15 is a left side view of a main part of the motorcycle in a state before the airbag is deployed.
Figure 16:
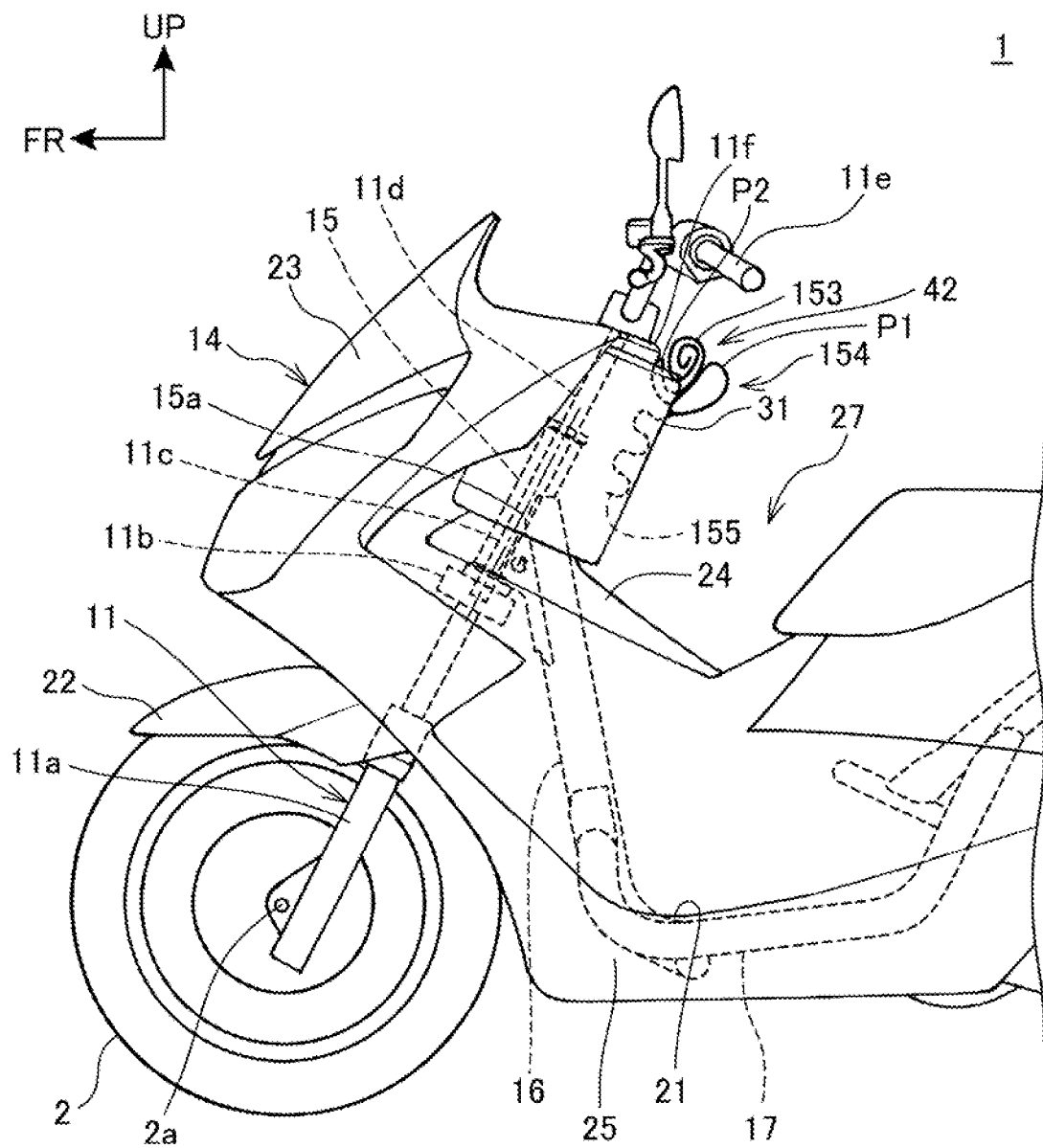
FIG. 16 is a continuation of FIG. 15 and is an explanatory view illustrating a state in which the airbag starts to be deployed.
Figure 17:
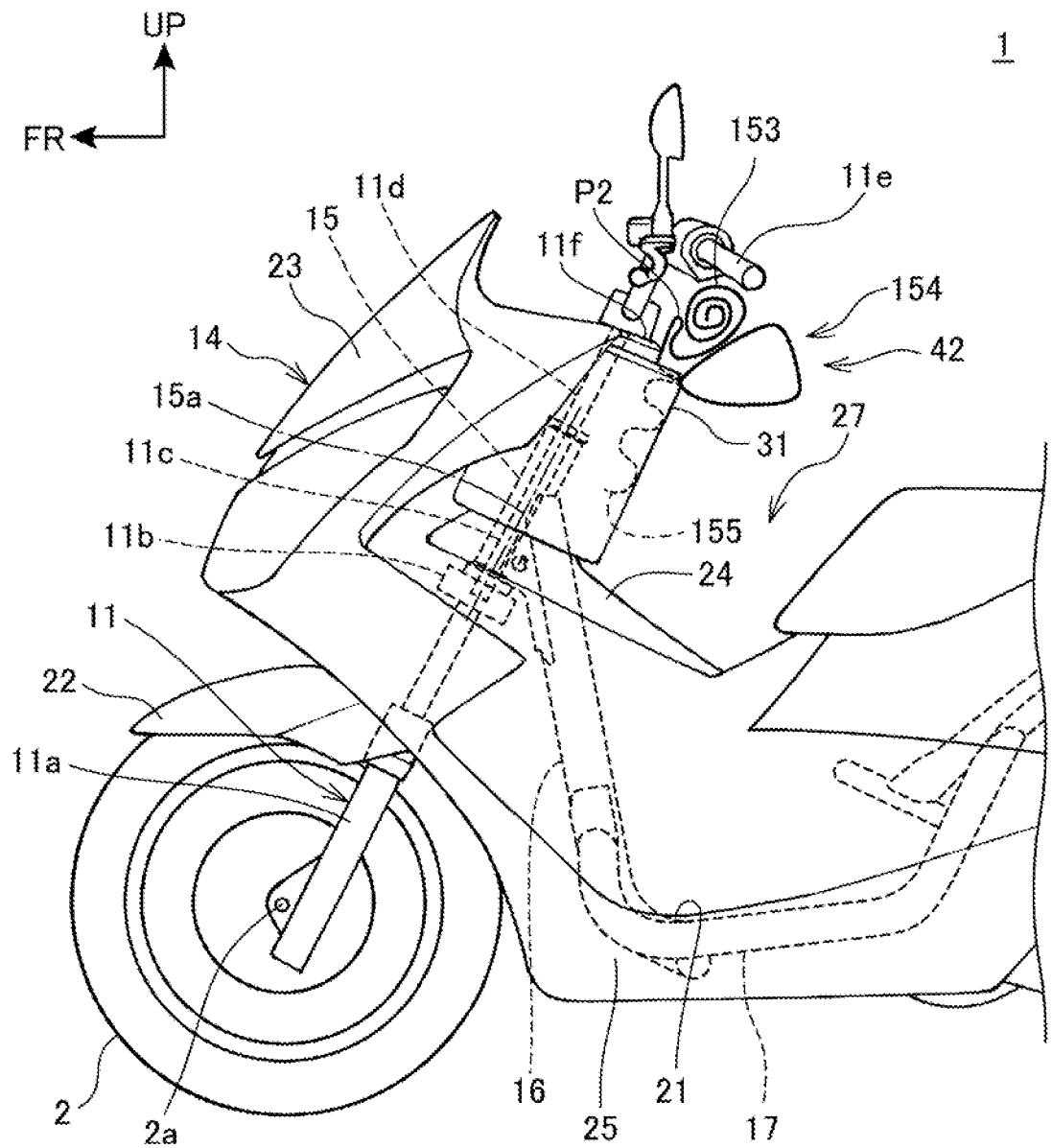
FIG. 17 is a continuation of FIG. 16 and is an explanatory view illustrating a state in which a first folded-back portion of the airbag starts to be deployed.
Figure 18:
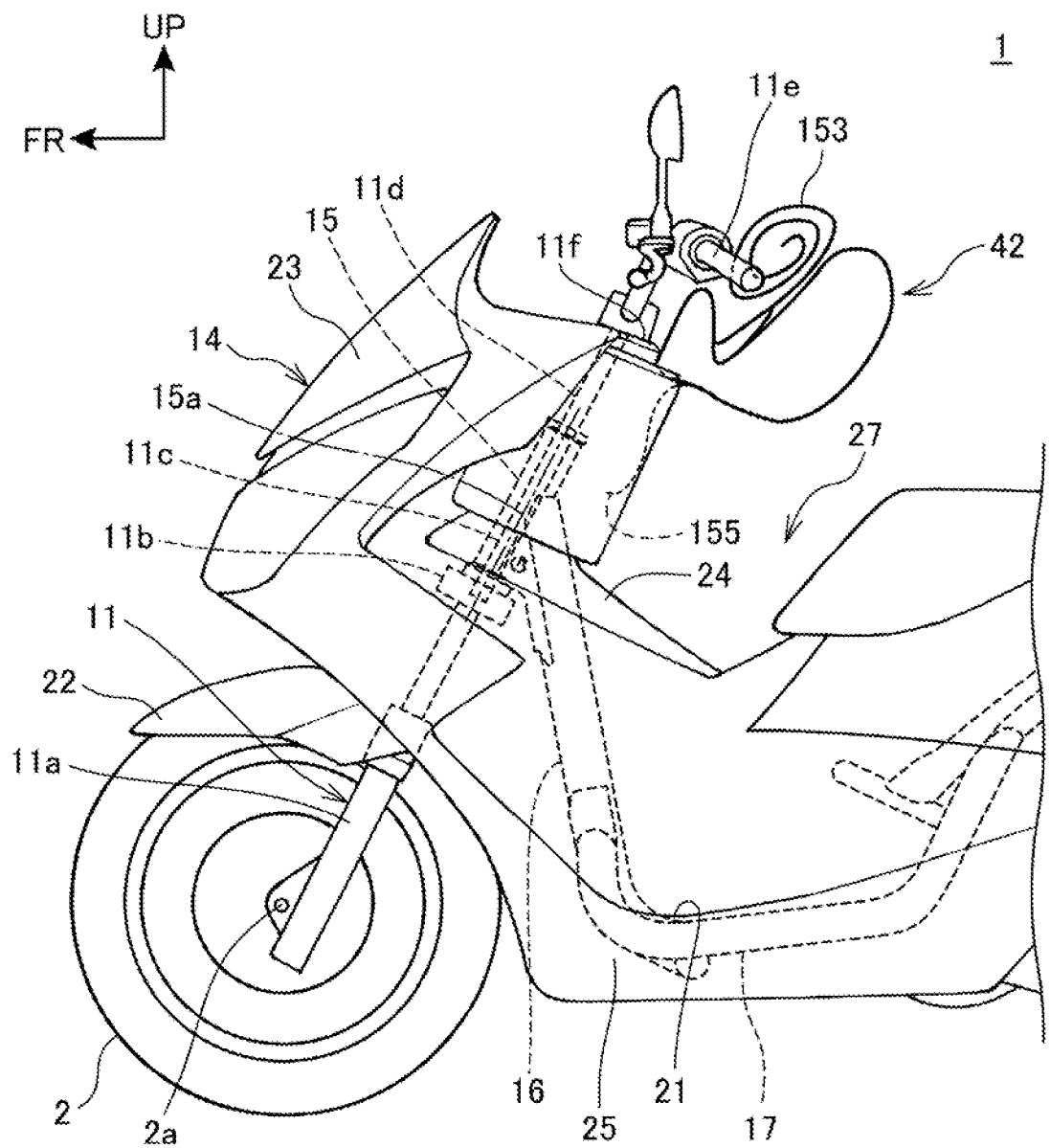
FIG. 18 is a continuation of FIG. 17 and is an explanatory view illustrating a state in which a second folded-back portion starts to be deployed.

FIG. 15 is a left side view of a main part of the motorcycle 1 in a state before the airbag 42 is deployed. FIG. 16 is a continuation of FIG. 15 and is an explanatory view illustrating a state in which the airbag 42 starts to be deployed. FIG. 17 is a continuation of FIG. 16 and is an explanatory view illustrating a state in which the first folded-back portion 154A of the airbag 42 starts to be deployed. FIG. 18 is a continuation of FIG. 17 and is an explanatory view illustrating a state in which the second folded-back portion 154B starts to be deployed.

Figure 19:
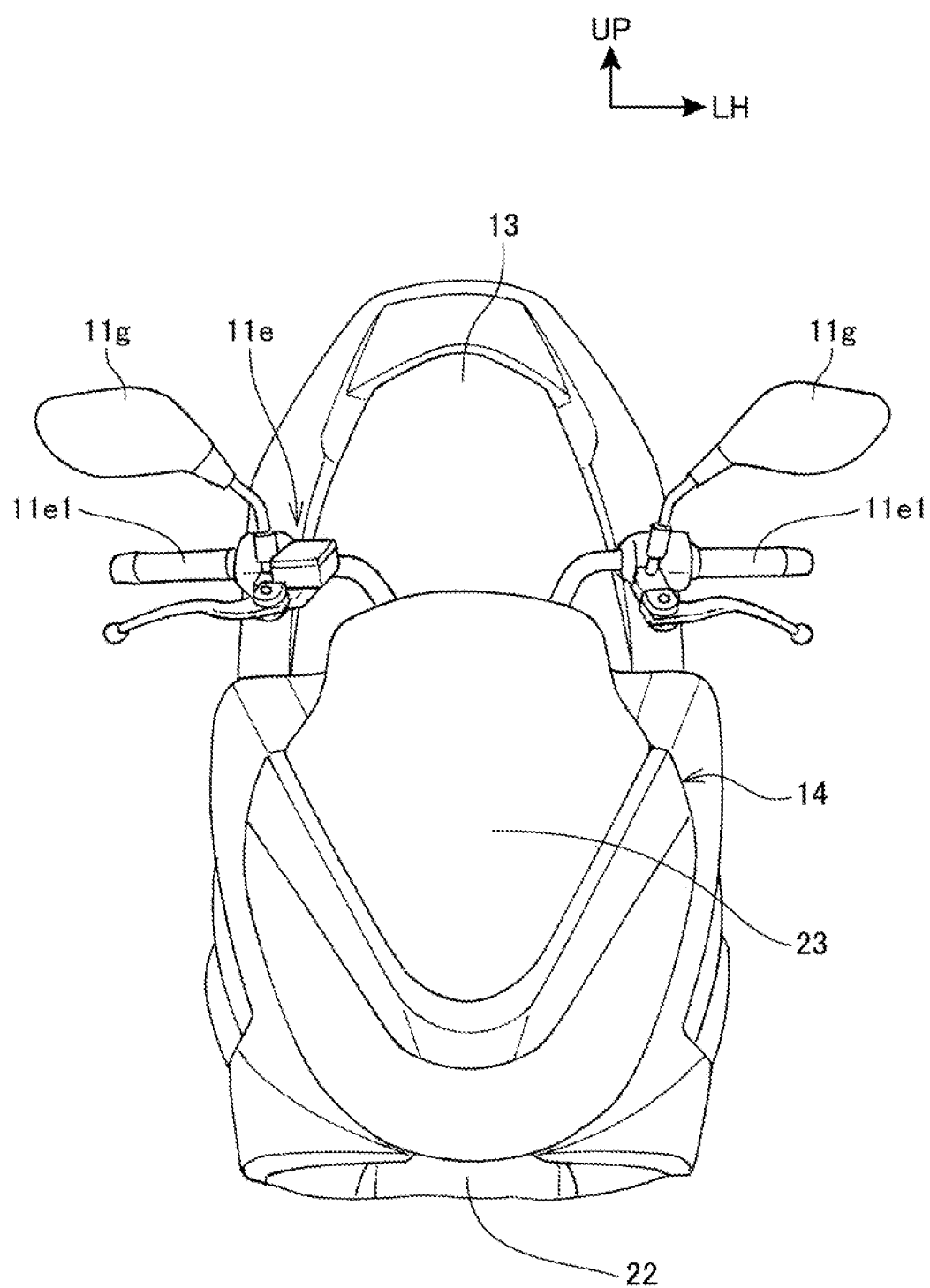
FIG. 19 is an explanatory view corresponding to a vehicle front upper view of FIG. 15.
Figure 20:
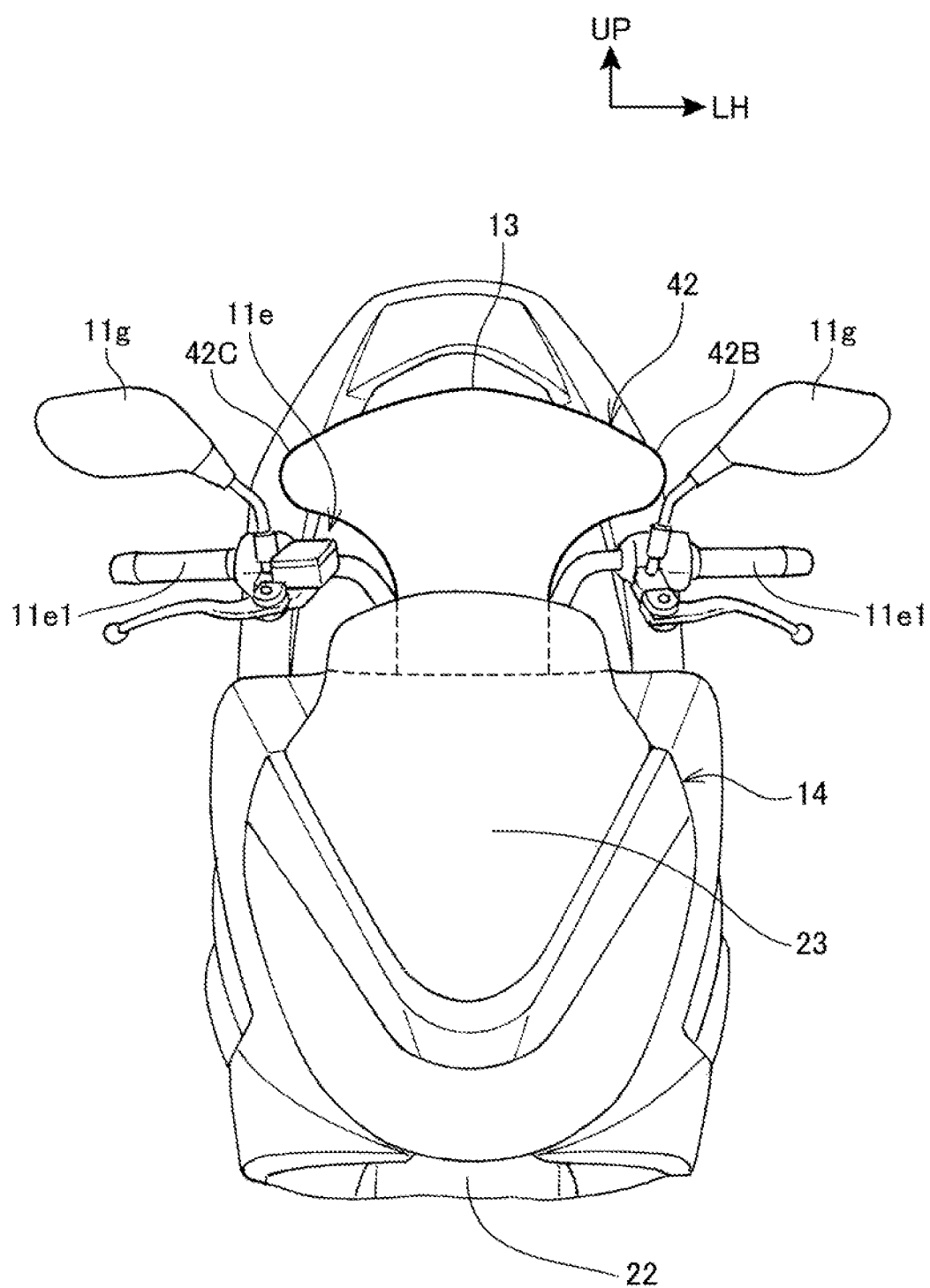
FIG. 20 is a continuation of FIG. 19 and is an explanatory view corresponding to a vehicle front upper view of FIG. 18.

FIG. 19 is an explanatory view corresponding to a vehicle front upper view of FIG. 15. FIG. 20 is a continuation of FIG. 19 and is an explanatory view corresponding to a vehicle front upper view of FIG. 18.

Next, the operation of the present embodiment will be described.

Once the inflator 43 of the airbag device 30 operates, the gas G is injected into the airbag 42. The airbag 42 inflates by a pressure of the gas G and deployed upward.

That is, when the inflator 43 operates, the gas G is injected to the loop diffuser 141. The gas G is guided by the loop diffuser 141 to move through the L-shaped proximal end portion 121. The gas G having passed through the proximal end portion 121 enters the outward deployment portion 122 to deploy the outward deployment portion 122. The outward deployment portion 122 supported by the proximal end portion 121 is easily deployed in a stable posture.

In the outward deployment portion 122, the proximal end-side folded portion 155, the intermediate-side folded portion 154, and the distal end-side folded portion 153 are deployed in the vehicle side view, and the bellows-shaped portions 151 and 152 are deployed in the left-right direction.

Once the proximal end-side folded portion 155 inflates, as illustrated in FIG. 16, the intermediate-side folded portion 154 and the distal end-side folded portion 153 rise. Accordingly, the exterior member 40 is broken, and the outward deployment portion 122 is deployed from the opening 48. In the present embodiment, the second fastening member 75 increases the support rigidity of the lower portion of the retainer 41, and when the airbag 42 inflates, the portion of the upper portion of the retainer 41 on the opening 48 side slightly moves toward the occupant side with the portion of the second fastening member 75 as a fulcrum, and is deformed to widen the opening 48. Therefore, the outward deployment portion 122 of the airbag 42 is easily deployed rearward immediately after the inflation.

Once the outward deployment portion 122 is deployed rearward, as illustrated in FIG. 17, the first folded-back portion 154A is deployed immediately below the handlebar 11e in the vehicle side view. The bellows-shaped portions 151 and 152 are deployed in the left-right direction.

The distal end-side folded portion 153 is disposed in front of the first folded-back portion 154A, and the distal end-side folded portion 153 receives a force to move forward from the deployed first folded-back portion 154A.

The panels 125 and 125 are sewn to the first folded-back portion 154A, and a circumferential length difference is generated between the front base fabric 123 and the rear base fabric 124. Therefore, the airbag 42 that pops out rearward from the retainer 41 is easily deployed upward after passing below the handlebar 11e, and is easily deployed while suppressing the airbag 42 from coming into contact with the handlebar 11e.

After the first folded-back portion 154A starts to be deployed, as illustrated in FIG. 18, the second folded-back portion 154B is deployed behind the handlebar holder 11f in the vehicle side view. As illustrated in FIG. 20, in the vehicle front upper view, the bellows-shaped portions 151 and 152 are deployed in a well-balanced manner in the left-right direction, the airbag 42 is unfolded outward in such a way as to be wider than the seat 13 in the left-right direction, and is deployed to the vicinity of bases (inner ends of left and right grips 11e1 and 11e1 of the handlebar 11e in the vehicle width direction) of rearview mirrors 11g and 11g.

The distal end-side folded portion 153 is disposed behind the second folded-back portion 154B, and the distal end-side folded portion 153 receives a force to move toward the occupant side (rear side) from the deployed second folded-back portion 154B.

A direction in which the distal end-side folded portion 153 is deployed is adjusted by the first folded-back portion 154A and the second folded-back portion 154B. The distal end-side folded portion 153 is folded in a roll shape and deployed while rotating.

As described above, the airbag 42 is efficiently deployed while being suppressed from coming into contact with the handlebar 11e (see FIG. 1).

As described above, according to the first embodiment to which the present invention is applied, the saddle-ride type vehicle includes: the retainer 41 that is provided behind the head pipe 15; the inflator 43; and the airbag 42 that is housed in the retainer 41, inflates by the gas G discharged by the inflator 43, and is deployed in front of the occupant, in which the airbag 42 is housed in the retainer 41 in a state of including the proximal end-side folded portion 155 folded in a bellows shape, the intermediate-side folded portion 154 extending from the proximal end-side folded portion 155 and folded above the proximal end-side folded portion 155, and the distal end-side folded portion 153 extending from the intermediate-side folded portion 154 and folded in a roll shape or a bellows shape in the cross section in the vehicle side view, and the intermediate-side folded portion 154 has the plurality of folding-back points P1 and P2 at which folding is made along the distal end-side folded portion 153 in the front-rear direction of the distal end-side folded portion 153 in the cross section in the vehicle side view. Therefore, the airbag 42 can be more efficiently deployed.

In the present embodiment, the folding-back points P1 and P2 are provided on the front side and the rear side of the distal end-side folded portion 153. Therefore, it is possible to adjust the direction in which the distal end-side folded portion 153 is deployed.

In the present embodiment, the retainer 41 extends along the head pipe 15 and is open upward, and the airbag 42 may have the folding-back points P1 and P2 provided adjacent to the front wall portion 65 and the rear wall portion 85 constituting the side surfaces of the retainer 41. Therefore, the airbag 42 can be more efficiently deployed.

In the present embodiment, the airbag 42 is folded bilaterally symmetrically with respect to the center line C1 of the airbag 42 in a cross section in the vehicle top view. Therefore, the airbag 42 can be deployed in a well-balanced manner in the left-right direction.

In the present embodiment, the bilaterally symmetrically folded airbag 42 has a bellows shape. Therefore, the airbag 42 can be easily folded and housed in the retainer 41.

In the present embodiment, the retainer 41 includes the L-shaped airbag passage 47 from which the airbag 42 is deployed upward from the left-right direction, and the airbag 42 is housed in the airbag passage 47. Therefore, it is possible to efficiently deploy the airbag 42 disposed in the L-shaped airbag passage 47.

Second Embodiment

Figure 21:
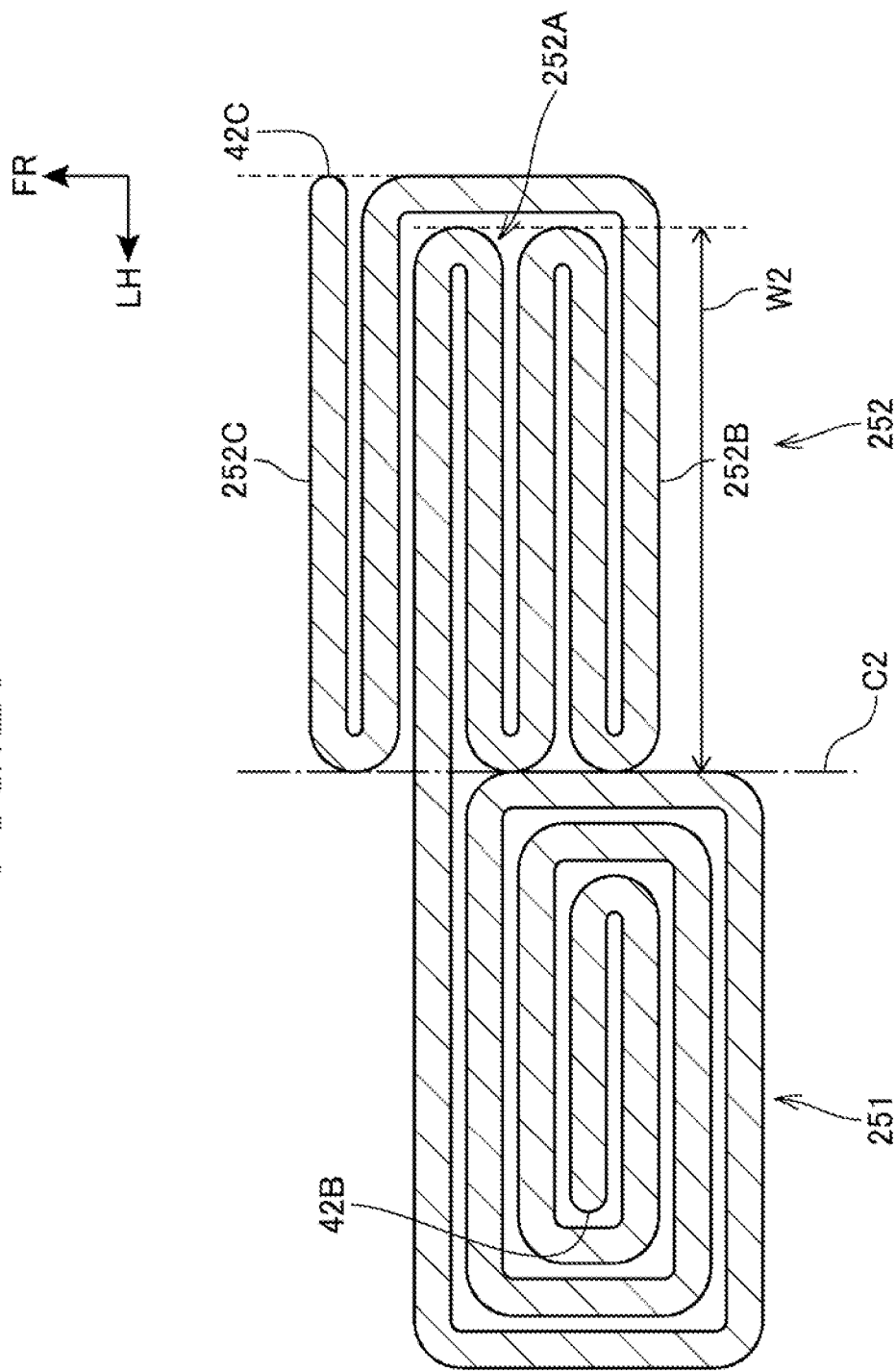
FIG. 21 is an explanatory view of a second embodiment and is a view corresponding to FIG. 13 of the first embodiment.

FIG. 21 is an explanatory view of a second embodiment and is a view corresponding to FIG. 13 of the first embodiment.

In the description of the second embodiment, the same components as those of the first embodiment are denoted by the same reference signs, and a description thereof will be omitted.

In an airbag 42 of the second embodiment, an outward deployment portion 122 is folded bilaterally asymmetrically with respect to center lines (horizontally central portions) C1 and C2. The airbag 42 of the second embodiment includes a roll-shaped portion 251 and an irregular bellows-shaped portion 252 instead of the bellows-shaped portions 151 and 152 according to the first embodiment.

Specifically, a portion of the outward deployment portion 122 that is positioned on a left end 42B side of the center line C1 (C2) is folded in a roll shape in a manner in which the left end 42B is bent rearward. As a result, the roll-shaped portion 251 folded in a roll shape is formed on the left side (one side in the left-right direction) of the center line C1 (C2) of the airbag 42.

A portion of the outward deployment portion 122 that is positioned on a right end 42C side of the center line C1 (C2) is folded rearward a plurality of times and folded in a bellows shape with a position corresponding to a predetermined length W2 on the right side of the center line C1 (C2) and a position corresponding to the center line C1 (C2) as folding-back points. In this manner, a bellows-shaped portion 252A is formed.

Next, the portion of the outward deployment portion 122 that is positioned on the right end 42C side is folded rearward with the position corresponding to the center line C1 (C2) as a folding-back point on the rear side of the bellows-shaped portion 252A, and is folded in such a way as to surround a rear portion, a right portion, and a front portion of the bellows-shaped portion 252A. In this manner, a surrounding portion 252B is formed.

The portion of the outward deployment portion 122 that is positioned on the right end 42C side is folded forward with the position corresponding to the center line C1 (C2) as a folding-back point at an inner end of a front portion of the surrounding portion 252B. In this manner, a front-side straight portion 252C is formed.

The irregular bellows-shaped portion 252 of the second embodiment includes the bellows-shaped portion 252A, the surrounding portion 252B, and the front-side straight portion 252C.

Therefore, in the second embodiment, the roll-shaped portion 251 folded in a roll shape is formed on the left side of the center line C1 (C2) on which the inflator 43 is disposed. The irregular bellows-shaped portion 252 folded in a bellows shape is formed on the right side of the center line C1 (C2) which is a side away from the inflator 43.

Although a configuration in which the center lines C1 and C2 are formed bilaterally asymmetrically is described in the present embodiment, the horizontally central portion based on which the center lines C1 and C2 are formed bilaterally asymmetrically does not need to coincide with the center lines C1 and C2, and may be shifted in the left-right direction from the center lines C1 and C2.

In the second embodiment, once the inflator 43 of the airbag device 30 operates, the gas G is injected into the airbag 42, and in the outward deployment portion 122, the proximal end-side folded portion 155, the intermediate-side folded portion 154, and the distal end-side folded portion 153 are deployed in the vehicle side view, and the roll-shaped portion 251 and the irregular bellows-shaped portion 252 are deployed in the left-right direction.

That is, in the vehicle side view, as in the first embodiment, the proximal end-side folded portion 155, the intermediate-side folded portion 154, and the distal end-side folded portion 153 are deployed.

On the other hand, the roll-shaped portion 251 and the irregular bellows-shaped portion 252 are deployed in the left-right direction. In general, the portion of the airbag 42 that is folded in the roll shape is deployed at a lower speed as compared with the portion of the airbag 42 that is folded in the bellows shape.

In the second embodiment, in the left-right direction, the roll-shaped portion 251 is positioned on the inflator 43 side with respect to the center line C1 (C2), and the irregular bellows-shaped portion 252 is positioned on a side opposite from the inflator 43 with respect to the center line C1 (C2). Therefore, the side where the gas G injected from the inflator 43 easily enters is folded in a roll shape. The side where the gas G injected from the inflator 43 hardly enters is folded in a bellows shape. In the second embodiment, it is easy to match deployment times of the left side and the right side (times required for deployment) at different distances from the inflator 43, and it is thus easy to efficiently deploy the airbag 42.

As described above, according to the second embodiment to which the present invention is applied, the saddle-ride type vehicle includes the retainer 41 that is provided behind the head pipe 15, the inflator 43, and the airbag 42 that is housed in the retainer 41, inflates by the gas G discharged by the inflator 43, and is deployed in front of the occupant, in which the airbag 42 is housed in the retainer 41 in a state of being folded bilaterally asymmetrically with respect to the center line C1 (C2) of the airbag 42 in the cross section in the vehicle top view. Therefore, the airbag 42 can be more efficiently deployed.

In the present embodiment, the airbag 42 is housed in the retainer 41 in a state in which the right side of the center line C1 (C2) of the airbag 42 is folded in a bellows shape and the left side of the center line C1 (C2) of the airbag 42 is folded in a roll shape in the cross section in the vehicle top view. Therefore, the deployment times of the airbag 42 in the left-right direction can be adjusted.

In the present embodiment, the inflator 43 is disposed on the left side of the center line C1 (C2) of the airbag 42, and the airbag 42 is connected to the inflator 43 on the left side of the center line C1 (C2) of the airbag 42. Therefore, it is possible to adjust the development times in the left-right direction by making the side where the gas G discharged from the inflator 43 easily reaches have a roll shape and making the side where the gas G discharged from the inflator 43 hardly reaches have a bellows shape.

Further, in the present embodiment, the airbag 42 is housed in the retainer 41 in a state of including the proximal end-side folded portion 155 folded in a bellows shape, the intermediate-side folded portion 154 extending from the proximal end-side folded portion 155 and folded above the proximal end-side folded portion 155, and the distal end-side folded portion 153 extending from the intermediate-side folded portion 154 and folded in a roll shape in the cross section in the vehicle side view, and the intermediate-side folded portion 154 has the plurality of folding-back points P1 and P2 at which folding is made along the distal end-side folded portion 153 in the front-rear direction of the distal end-side folded portion 153 in the cross section in the vehicle side view. Therefore, the airbag 42 can be more efficiently deployed.

In the present embodiment, the retainer 41 extends along the head pipe 15 and is open upward, and the airbag 42 may have the folding-back points P1 and P2 provided adjacent to the front wall portion 65 and the rear wall portion 85 constituting the side surfaces of the retainer 41. Therefore, the airbag 42 can be more efficiently deployed.

In the present embodiment, the retainer 41 includes the L-shaped airbag passage 47 from which the airbag 42 is deployed upward from the left-right direction, and the airbag 42 is housed in the airbag passage 47. Therefore, it is possible to efficiently deploy the airbag 42 disposed in the L-shaped airbag passage 47.

Third Embodiment

Figure 22:
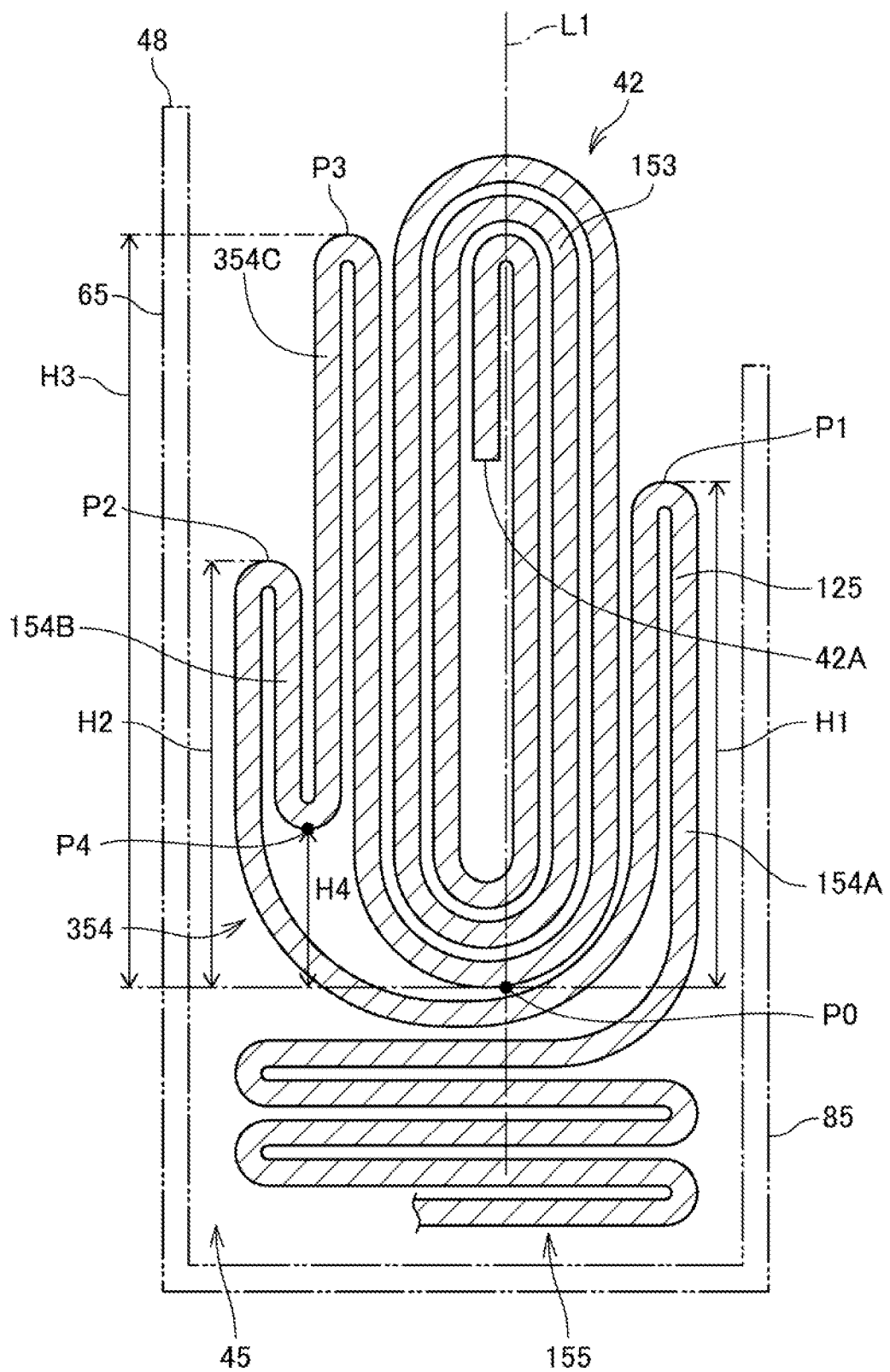
FIG. 22 is an explanatory view of a third embodiment and is a view corresponding to FIG. 14 of the first embodiment.

FIG. 22 is an explanatory view of a third embodiment and is a view corresponding to FIG. 14 of the first embodiment.

In the description of the third embodiment, the same components as those of the first embodiment are denoted by the same reference signs, and a description thereof will be omitted.

An airbag 42 of the third embodiment is folded in a state in which a third folding-back point P3 is added in a vehicle side view. The third folding-back point P3 is formed between a second folded-back portion 154B and a distal end-side folded portion 153. That is, a third folded-back portion 354C is disposed between the second folded-back portion 154B and the distal end-side folded portion 153.

The third folded-back portion 354C includes a portion extending downward from the third folding-back point P3 along a virtual line L1. A fourth folding-back point P4 is formed as a connecting portion between the third folded-back portion 354C and the second folded-back portion 154B. The first to third folding-back points P1 to P3 are folding-back points P1 to P3 at which the folding-back is made downward. On the other hand, the fourth folding-back point P4 is a folding-back point P4 at which the folding-back is made upward.

An intermediate-side folded portion 354 is formed between a proximal end-side folded portion 155 and the distal end-side folded portion 153. The intermediate-side folded portion 354 of the third embodiment includes a first folded-back portion 154A, the second folded-back portion 154B, and the third folded-back portion 354C.

A height H3 of the third folding-back point P3 is set to a length from a connecting portion P0 to the third folding-back point P3 along the virtual line L1. A height H4 of the fourth folding-back point P4 is set to a length from the connecting portion P0 to the fourth folding-back point P4 along the virtual line L1.

The height H3 of the third folding-back point P3 is higher than the height H1 of the first folding-back point P1. The height H4 of the fourth folding-back point P4 is higher than the connecting portion P0 between the distal end-side folded portion 153 and the intermediate-side folded portion 354.

In the third embodiment, once an inflator 43 of an airbag device 30 operates, gas G is injected into the airbag 42. As a result, in an outward deployment portion 122, the proximal end-side folded portion 155, the intermediate-side folded portion 354, and the distal end-side folded portion 153 are deployed in a vehicle side view, and bellows-shaped portions 151 and 152 are deployed in the left-right direction.

In the third embodiment, when the intermediate-side folded portion 354 is deployed, the first folded-back portion 154A, the second folded-back portion 154B, and the third folded-back portion 354C are deployed. Since the height H3 of the third folded-back portion 354C is higher than the height H1 of the first folded-back portion 154A, the third folded-back portion 354C is easily interposed between a handlebar holder 11f and the distal end-side folded portion 153 when the distal end-side folded portion 153 is deployed. Therefore, contact with the handlebar holder 11f is suppressed when the distal end-side folded portion 153 is deployed, and the roll-shaped distal end-side folded portion 153 is easily deployed efficiently.

Each of the above embodiments illustrates one aspect to which the present invention is applied, and the present invention is not limited to the above embodiments.

Although a configuration in which the distal end-side folded portion 153 is folded in a roll shape has been described in the above embodiments, the distal end-side folded portion may be folded in a bellows shape.

Although a configuration in which the proximal end-side folded portion 155 is folded in a bellows shape has been described in the above embodiments, the proximal end-side folded portion may be folded in a roll shape.

Furthermore, although a configuration in which the first folding-back point P1 and the second folding-back point P2 are provided has been described in the first embodiment and the second embodiment, three or more folding-back points may be provided.

Although a configuration in which the bellows-shaped portions 151 and 152 are formed has been described in the third embodiment, but the roll-shaped portion 251 and the irregular bellows-shaped portion 252 may be formed instead of the bellows-shaped portions 151 and 152.

In the above embodiments, it is preferable that the folding-back points P1 to P3 are formed on the front side and the rear side of the distal end-side folded portion 153. However, a configuration in which the folding-back points P1 to P3 are formed only on one of the front side and the rear side of the distal end-side folded portion 153 is also possible.

In addition, in the above embodiment, the motorcycle 1 has been described as an example of the saddle-ride type vehicle. The present invention, however, is not limited thereto, and thus the present invention is applicable to a three-wheeled saddle-ride type vehicle having two front wheels or two rear wheels, and a saddle-ride type vehicle having four or more wheels.

REFERENCE SIGNS LIST

1 Motorcycle (saddle-ride type vehicle)
15 Head pipe
41 Retainer
42 Airbag
43 Inflator
47 Airbag passage
65 Front wall portion (side surface)
85 Rear wall portion (side surface)

153 Distal end-side folded portion
154, 354 Intermediate-side folded portion
155 Proximal end-side folded portion
C1, C2 Center line (left-right center line)
G Gas
P1, P2, P3 Folding-back point

The invention claimed is:

1. A saddle-ride vehicle comprising: a retainer that is provided behind a head pipe; an inflator; and an airbag that is housed in the retainer, inflates by gas discharged by the inflator, and is deployed in front of an occupant,
   wherein the airbag is housed in the retainer in a state of including a proximal end-side folded portion folded in a roll shape or a bellows shape, an intermediate-side folded portion extending from the proximal end-side folded portion and folded above the proximal end-side folded portion, and a distal end-side folded portion extending from the intermediate-side folded portion and folded in a roll shape or a bellows shape in a cross section in a vehicle side view,
   the distal end-side folded portion has a folded portion extending along a virtual line extending in a vertical direction in the cross section in the vehicle side view,
   the intermediate-side folded portion has a plurality of folding-back points at which folding is made along the distal end-side folded portion in a front-rear direction of the distal end-side folded portion in the cross section in the vehicle side view,
   the folding is made downward at the first folding-back point,
   the folding is made downward at the second folding-back point, and
   a height from a connecting portion where the distal end-side folded portion and the intermediate-side folded portion are connected to each other to the first folding-back point along the virtual line is different from a height from the connecting portion to the second folding-back point along the virtual line.

2. The saddle-ride vehicle according to claim 1,
   wherein the folding-back points are provided on a front side and a rear side of the distal end-side folded portion.

3. The saddle-ride vehicle according to claim 1,
   wherein the retainer extends along the head pipe and is open upward, and
   the airbag has the folding-back point provided adjacent to a side surface of the retainer.

4. The saddle-ride vehicle according to claim 1,
   wherein the airbag is folded bilaterally symmetrically with respect to a left-right center line of the airbag in a cross section in a vehicle top view.

5. The saddle-ride vehicle according to claim 4,
   wherein the bilaterally symmetrically folded airbag has a bellows shape.

6. The saddle-ride vehicle according to claim 1,
   wherein the retainer includes an L-shaped airbag passage from which the airbag is deployed upward from a left-right direction, and
   the airbag is housed in the airbag passage.

* * * * *